US012776120B1

(12) United States Patent
Feider-Sullivan et al.

(10) Patent No.: US 12,776,120 B1
(45) Date of Patent: Oct. 27, 2026

(54) FEATURE DETECTION USING POLYGONAL AREAS OF INTEREST

(71) Applicant: Samsara Inc., San Francisco, CA (US)

(72) Inventors: Seamus Feider-Sullivan, San Francisco, CA (US); Joyce Chen, San Francisco, CA (US); Lucy Wan, San Francisco, CA (US); Arthur Huang, San Francisco, CA (US); Akshay Raj Dhamija, Campbell, CA (US); Matthew Basham, Oakland, CA (US); Jason Symons, Dublin, CA (US); Matt Geddie, New York, NY (US)

(73) Assignee: Samsara Inc., San Francisco, CA (US)

( * ) Notice: Subject to any disclaimer, the term of this patent is extended or adjusted under 35 U.S.C. 154(b) by 301 days.

(21) Appl. No.: 18/483,412

(22) Filed: Oct. 9, 2023

Related U.S. Application Data

(60) Provisional application No. 63/381,895, filed on Nov. 1, 2022.

(51) Int. Cl.

| | |
|---|---|
| ***G06V 10/25*** | (2022.01) |
| ***G06F 3/0484*** | (2022.01) |
| ***G06V 10/40*** | (2022.01) |

(52) U.S. Cl.
CPC ............ *G06V 10/40* (2022.01); *G06F 3/0484* (2013.01); *G06V 10/25* (2022.01)

(58) Field of Classification Search
CPC ........................................................ G06T 7/11
See application file for complete search history.

(56) References Cited

U.S. PATENT DOCUMENTS

| | | |
|---|---|---|
| 6,157,864 A | 12/2000 | Schwenke et al. |
| 6,801,920 B1 | 10/2004 | Wischinski |
| 7,596,417 B2 | 9/2009 | Fister et al. |
| 7,957,936 B2 | 6/2011 | Eryurek et al. |
| 8,024,311 B2 | 9/2011 | Wood et al. |

(Continued)

FOREIGN PATENT DOCUMENTS

| | | |
|---|---|---|
| JP | 2020113875 A * | 7/2020 |
| WO | WO 2019/099409 A1 | 5/2019 |

(Continued)

OTHER PUBLICATIONS

Malamas, Elias N. et al. "A survey on industrial vision systems, applications and tools", Sep. 17, 2002, Image and Vision Computing 21, pp. 171-188.

*Primary Examiner* — Di Xiao
(74) *Attorney, Agent, or Firm* — Knobbe, Martens, Olson & Bear, LLP

(57) ABSTRACT

A computing system connected to a video device. The computing system accesses video data to obtain a video stream of an environment and displays an image of the environment on a user interface. The computing system receives a user defined polygonal area of interest and a feature detection algorithm associated with a particular feature of interest. The computing system periodically executes the feature detection algorithm on recent images of the video stream and outputs feature coordinates in response to detection of the particular feature of interest. Based on detecting the particular feature of interest, the computing system determines whether the feature coordinates are at least partially within the polygonal area of interest and if so, initiates a notification.

18 Claims, 23 Drawing Sheets

(56) References Cited

U.S. PATENT DOCUMENTS

| | | | |
|---|---|---|---|
| 9,036,001 | B2 * | 5/2015 | Chuang ................ H04N 23/698 348/335 |
| 9,230,250 | B1 | 1/2016 | Parker et al. |
| 9,235,899 | B1 | 1/2016 | Kirmani et al. |
| 9,445,270 | B1 | 9/2016 | Bicket et al. |
| 10,033,706 | B2 | 7/2018 | Bicket et al. |
| 10,085,149 | B2 | 9/2018 | Bicket et al. |
| 10,102,495 | B1 | 10/2018 | Zhang et al. |
| 10,173,486 | B1 | 1/2019 | Lee et al. |
| 10,196,071 | B1 | 2/2019 | Rowson et al. |
| 10,206,107 | B2 | 2/2019 | Bicket et al. |
| 10,388,075 | B2 | 8/2019 | Schmirler et al. |
| 10,390,227 | B2 | 8/2019 | Bicket et al. |
| 10,444,949 | B2 | 10/2019 | Scott et al. |
| 10,579,123 | B2 | 3/2020 | Tuan et al. |
| 10,609,114 | B1 | 3/2020 | Bicket et al. |
| 10,827,324 | B1 | 11/2020 | Hajimiri et al. |
| 10,843,659 | B1 | 11/2020 | Innocenzi et al. |
| 10,969,852 | B2 | 4/2021 | Tuan et al. |
| 10,979,871 | B2 | 4/2021 | Hajimiri et al. |
| 10,999,269 | B2 | 5/2021 | Bicket et al. |
| 10,999,374 | B2 | 5/2021 | ElHattab et al. |
| 11,046,205 | B1 | 6/2021 | Govan et al. |
| 11,080,568 | B2 | 8/2021 | ElHattab et al. |
| 11,122,488 | B1 | 9/2021 | Lloyd et al. |
| 11,126,910 | B1 | 9/2021 | Akhtar et al. |
| 11,127,130 | B1 | 9/2021 | Jain et al. |
| 11,131,986 | B1 | 9/2021 | Gal et al. |
| 11,132,853 | B1 | 9/2021 | Akhtar et al. |
| 11,137,744 | B1 | 10/2021 | Heddleston et al. |
| 11,158,177 | B1 | 10/2021 | ElHattab et al. |
| 11,184,422 | B1 | 11/2021 | Bicket et al. |
| 11,188,046 | B1 | 11/2021 | ElHattab et al. |
| 11,190,373 | B1 | 11/2021 | Stevenson et al. |
| 11,204,637 | B2 | 12/2021 | Tuan et al. |
| 11,341,786 | B1 | 5/2022 | Calmer et al. |
| 11,349,901 | B1 | 5/2022 | Duffield et al. |
| 11,352,013 | B1 | 6/2022 | Srinivasan et al. |
| 11,352,014 | B1 | 6/2022 | Srinivasan et al. |
| 11,356,605 | B1 | 6/2022 | Shemet et al. |
| 11,356,909 | B1 | 6/2022 | Lloyd |
| 11,365,980 | B1 | 6/2022 | Akhtar et al. |
| 11,386,325 | B1 | 7/2022 | Srinivasan et al. |
| 11,451,610 | B1 | 9/2022 | Saunders et al. |
| 11,451,611 | B1 | 9/2022 | Saunders et al. |
| 11,460,507 | B2 | 10/2022 | Lloyd et al. |
| 11,464,079 | B1 | 10/2022 | Aschenbener et al. |
| 11,479,142 | B1 | 10/2022 | Govan et al. |
| 11,494,921 | B2 | 11/2022 | ElHattab et al. |
| 11,522,857 | B1 | 12/2022 | Symons et al. |
| 11,558,449 | B1 | 1/2023 | Bicket et al. |
| 11,595,632 | B2 | 2/2023 | Tsai et al. |
| 11,599,097 | B1 | 3/2023 | Gal et al. |
| 11,606,736 | B1 | 3/2023 | Lloyd et al. |
| 11,611,621 | B2 | 3/2023 | ElHattab et al. |
| 11,620,909 | B2 | 4/2023 | Tsai et al. |
| 11,627,252 | B2 | 4/2023 | Delegard et al. |
| 11,641,388 | B1 | 5/2023 | Saunders et al. |
| 11,641,604 | B1 | 5/2023 | Lloyd |
| 11,643,102 | B1 | 5/2023 | Calmer et al. |
| 11,659,060 | B2 | 5/2023 | Davis et al. |
| 11,665,223 | B1 | 5/2023 | Duffield et al. |
| 11,669,714 | B1 | 6/2023 | Akhtar et al. |
| 11,671,478 | B1 | 6/2023 | Saunders et al. |
| 11,674,813 | B1 | 6/2023 | Chung et al. |
| 11,675,042 | B1 | 6/2023 | Lloyd et al. |
| 11,683,579 | B1 | 6/2023 | Symons et al. |
| 11,688,211 | B1 | 6/2023 | Calmer et al. |
| 11,694,317 | B1 | 7/2023 | Jain et al. |
| 11,704,984 | B1 | 7/2023 | ElHattab et al. |
| 11,709,500 | B2 | 7/2023 | Lloyd et al. |
| 11,710,409 | B2 | 7/2023 | Nanda et al. |
| 11,720,087 | B1 | 8/2023 | Heddleston et al. |
| 11,731,469 | B1 | 8/2023 | McGillan |
| 11,736,312 | B1 | 8/2023 | Xiao et al. |
| 11,741,760 | B1 | 8/2023 | Dubin et al. |
| 11,748,377 | B1 | 9/2023 | Zhang et al. |
| 11,752,895 | B1 | 9/2023 | Govan et al. |
| 11,756,346 | B1 | 9/2023 | Wu et al. |
| 11,756,351 | B1 | 9/2023 | Akhtar et al. |
| 11,758,096 | B2 | 9/2023 | Shah et al. |
| 11,776,328 | B2 | 10/2023 | Yang et al. |
| 11,780,446 | B1 | 10/2023 | Srinivasan et al. |
| 11,782,930 | B2 | 10/2023 | McGee et al. |
| 11,787,413 | B2 | 10/2023 | Tsai et al. |
| 11,800,317 | B1 | 10/2023 | Dugar et al. |
| 11,838,884 | B1 | 12/2023 | Dergosits et al. |
| 11,842,577 | B1 | 12/2023 | Harrison et al. |
| 11,847,911 | B2 | 12/2023 | ElHattab et al. |
| 11,855,801 | B1 | 12/2023 | Stevenson et al. |
| 11,861,955 | B1 | 1/2024 | Dubin et al. |
| 11,863,712 | B1 | 1/2024 | Young et al. |
| 11,866,055 | B1 | 1/2024 | Srinivasan et al. |
| 11,868,919 | B1 | 1/2024 | Zhang et al. |
| 11,875,683 | B1 | 1/2024 | Tsai et al. |
| 11,890,962 | B1 | 2/2024 | Govan et al. |
| 11,937,152 | B2 | 3/2024 | Hajimiri et al. |
| 11,938,948 | B1 | 3/2024 | Davis et al. |
| 11,959,772 | B2 | 4/2024 | Robbins et al. |
| 11,974,410 | B1 | 4/2024 | Lin et al. |
| 11,975,685 | B1 | 5/2024 | Innocenzi et al. |
| 11,989,001 | B1 | 5/2024 | ElHattab et al. |
| 11,995,546 | B1 | 5/2024 | Srinivasan et al. |
| 11,997,181 | B1 | 5/2024 | Davis et al. |
| 12,000,940 | B1 | 6/2024 | Lloyd et al. |
| 12,073,619 | B1 * | 8/2024 | Cheruku ................ G06V 20/40 |
| 12,106,613 | B2 | 10/2024 | Calmer et al. |
| 12,117,546 | B1 | 10/2024 | Lloyd et al. |
| 12,126,917 | B1 | 10/2024 | Shemet et al. |
| 12,128,919 | B2 | 10/2024 | Calmer et al. |
| 12,140,445 | B1 | 11/2024 | Akhtar et al. |
| 12,150,186 | B1 | 11/2024 | Aguilar et al. |
| 12,165,360 | B1 | 12/2024 | Jain et al. |
| 12,168,445 | B1 | 12/2024 | Srinivasan et al. |
| 12,172,653 | B1 | 12/2024 | Akhtar et al. |
| 12,179,629 | B1 | 12/2024 | Govan et al. |
| 12,197,610 | B2 | 1/2025 | Wen et al. |
| 12,213,090 | B1 | 1/2025 | Dergosits et al. |
| 12,228,944 | B1 | 2/2025 | Dubin et al. |
| 12,253,617 | B1 | 3/2025 | Aguilar et al. |
| 12,256,021 | B1 | 3/2025 | Torres et al. |
| 12,260,616 | B1 | 3/2025 | Rajan et al. |
| 12,269,498 | B1 | 4/2025 | Rommel et al. |
| 12,289,181 | B1 | 4/2025 | Stevenson et al. |
| 12,306,010 | B1 | 5/2025 | Rommel et al. |
| 12,327,445 | B1 | 6/2025 | Eberhardt et al. |
| 12,328,639 | B1 | 6/2025 | Smith et al. |
| 12,344,168 | B1 | 7/2025 | Wang et al. |
| 12,346,712 | B1 | 7/2025 | Eberhardt et al. |
| 12,367,718 | B1 | 7/2025 | Calmer et al. |
| 12,368,903 | B1 | 7/2025 | Lin et al. |
| 12,426,007 | B1 | 9/2025 | Aguilar et al. |
| 12,445,285 | B1 | 10/2025 | McHugh et al. |
| 12,450,329 | B1 | 10/2025 | Torres et al. |
| 12,479,446 | B1 | 11/2025 | Jurden et al. |
| 2002/0169850 | A1 | 11/2002 | Batke et al. |
| 2013/0211559 | A1 | 8/2013 | Lawson et al. |
| 2014/0328517 | A1 | 11/2014 | Gluncic |
| 2014/0337429 | A1 | 11/2014 | Asenjo et al. |
| 2017/0060726 | A1 | 3/2017 | Glistvain |
| 2017/0123397 | A1 | 5/2017 | Billi et al. |
| 2017/0195265 | A1 | 7/2017 | Billi et al. |
| 2017/0278004 | A1 | 9/2017 | McElhinney et al. |
| 2018/0174413 | A1 * | 6/2018 | Siminoff ................ H04N 7/186 |
| 2018/0234514 | A1 | 8/2018 | Rajiv et al. |
| 2018/0356800 | A1 | 12/2018 | Chao et al. |
| 2018/0364686 | A1 | 12/2018 | Naidoo et al. |
| 2019/0327613 | A1 | 10/2019 | Bicket et al. |
| 2020/0103286 | A1 * | 4/2020 | Ikeda ....................... A61B 5/01 |
| 2020/0150739 | A1 | 5/2020 | Tuan et al. |
| 2020/0342230 | A1 | 10/2020 | Tsai et al. |
| 2020/0342235 | A1 | 10/2020 | Tsai et al. |
| 2020/0342274 | A1 | 10/2020 | ElHattab et al. |
| 2020/0342611 | A1 | 10/2020 | ElHattab et al. |

(56) References Cited

U.S. PATENT DOCUMENTS

| | | | |
|---|---|---|---|
| 2020/0344301 | A1 | 10/2020 | ElHattab et al. |
| 2021/0006950 | A1 | 1/2021 | Hajimiri et al. |
| 2022/0289203 | A1 | 9/2022 | Makilya et al. |
| 2022/0335795 | A1* | 10/2022 | Dice ................ G08B 13/19613 |
| 2022/0345623 | A1* | 10/2022 | McRae .................. H04N 7/188 |
| 2022/0404784 | A1* | 12/2022 | Deng ................... H05B 47/115 |
| 2023/0219592 | A1 | 7/2023 | Calmer et al. |
| 2023/0298410 | A1 | 9/2023 | Calmer et al. |
| 2024/0003749 | A1 | 1/2024 | Lin et al. |
| 2024/0063596 | A1 | 2/2024 | Pandian et al. |
| 2024/0146629 | A1 | 5/2024 | Lloyd |
| 2025/0002033 | A1 | 1/2025 | Calmer et al. |

FOREIGN PATENT DOCUMENTS

| | | | |
|---|---|---|---|
| WO | WO 2019/125545 | A1 | 6/2019 |
| WO | WO 2019/133533 | A1 | 7/2019 |
| WO | WO 2023/244513 | A1 | 12/2023 |

* cited by examiner

400

401

FEATURE DETECTION USING POLYGONAL AREAS OF INTEREST

CROSS-REFERENCE TO RELATED APPLICATIONS

This application claims the benefit of priority of U.S. Provisional Patent Application No. 63/381,895, filed Nov. 1, 2022, entitled "FEATURE DETECTION USING POLYGONAL AREAS OF INTEREST," which is hereby incorporated by reference herein in its entirety and for all purposes. Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of the present disclosure relate to devices, systems, and methods that process video data from cameras.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Processing sensor data from on-premises equipment, such as cameras, to detect features of interest can be difficult. Accurately isolating a complex or angled area in a video stream to determine if a feature of interest is present in that area presents further challenges.

SUMMARY

The systems, methods, and devices described herein each have several aspects, no single one of which is solely responsible for its desirable attributes. Without limiting the scope of this disclosure, several non-limiting features will now be described briefly.

Further, as described herein, according to various embodiments, systems and or devices may be configured and/or designed to generate graphical user interface data useable for rendering the various interactive graphical user interfaces described. The graphical user interface data may be used by various devices, systems, and/or software programs (for example, a browser program), to render the interactive graphical user interfaces. The interactive graphical user interfaces may be displayed on, for example, electronic displays (including, for example, touch-enabled displays).

Additionally, the present disclosure describes various embodiments of interactive and dynamic graphical user interfaces that are the result of significant development. This non-trivial development has resulted in the graphical user interfaces described herein which may provide significant cognitive and ergonomic efficiencies and advantages over previous systems. The interactive and dynamic graphical user interfaces include improved human-computer interactions that may provide reduced mental workloads, improved decision-making, improved capabilities, reduced work stress, and/or the like, for a user. For example, user interaction with the interactive graphical user interface via the inputs described herein may provide an optimized display of, and interaction with, gateway devices, and may enable a user to more quickly and accurately access, navigate, assess, and digest analyses, configurations, image data, and/or the like, than previous systems.

Various embodiments of the present disclosure provide improvements to various technologies and technological fields, and practical applications of various technological features and advancements. For example, existing feature detection systems are limited in various ways, such as by areas of interest that can only be defined as rectangles in units of, e.g., $1/10^{th}$ the width and height of the stream. Various embodiments of the present disclosure provide significant improvements over such technology, and practical applications of such improvements. Additionally, various embodiments of the present disclosure are inextricably tied to, and provide practical applications of, computer technology. In particular, various embodiments rely on detection of user inputs via graphical user interfaces, operation and configuration of cameras and video processing devices, calculation of updates to displayed electronic data based on user inputs, automatic processing of image data, and presentation of updates to displayed images and analyses via interactive graphical user interfaces. Such features and others are intimately tied to, and enabled by, computer and gateway technology, and would not exist except for computer and gateway technology.

In some embodiments, discussed herein, a computerized method, performed by a computing system having one or more hardware computer processors and one or more non-transitory computer readable storage device storing software instructions executable by the computing system to perform a computerized method is disclosed. The computerized method comprising: accessing video data from a video device positioned to obtain a video stream of an environment, wherein the video stream includes a plurality of images each having a common coordinate space; displaying, on a display of the computing system, an interactive user interface including at least a portion of a first image of the plurality of images of the environment; receiving, via the interactive user interface, user input defining a polygonal area of interest overlapping at least a portion of the first image, wherein the polygonal area of interest is defined by at least three coordinates within the coordinate space; receiving, via the interactive user interface, user input selecting a feature detection algorithm associated with a particular feature of interest; periodically executing the selected feature detection algorithm on one or more of the most recent images of the video stream, wherein the feature detection algorithm is configured to output feature coordinates within the coordinate space in response to detection of the particular feature of interest; in response to detection of the particular feature of interest, determining whether the detected feature of interest at least partially overlaps with the polygonal area of interest; and if the detected feature of interest at least partially overlaps with the polygonal area of interest, initiating a notification.

In some embodiments, discussed herein, a computerized method, performed by a computing system having one or more hardware computer processors and one or more non-transitory computer readable storage device storing software instructions executable by the computing system to perform a computerized method is disclosed. The computerized method comprising: accessing video data from a video device positioned to obtain a video stream of an environment, wherein the video stream includes a plurality of images each having a common coordinate space; transmitting to a user device at least a portion of a first image of the plurality of images of the environment; receiving, from the user device, information identifying a polygonal area of interest associated with first image; periodically executing a detection algorithm on the video stream, wherein the feature detection algorithm is configured to output feature coordinates within the coordinate space in response to detection of the particular feature of interest; in response to detection of the particular feature of interest, determining whether the detected feature of interest at least partially overlaps with the polygonal area of interest; and if the detected feature of interest at least partially overlaps with the polygonal area of interest, initiating a notification.

In some embodiments, discussed herein, a computerized method, performed by a computing system having one or more hardware computer processors and one or more non-transitory computer readable storage device storing software instructions executable by the computing system to perform a computerized method is disclosed. The computerized method comprising: receiving, from a gateway device in communication with one or more cameras, a first image of a video stream a first camera; displaying, on a display of a user device, an interactive user interface depicting at least a portion of the first image; receiving, via the interactive user interface, user input defining a polygonal area of interest overlapping at least a portion of the first image; transmitting information identifying the polygonal area of interest to a feature detection component, wherein the feature detection component is configured to detect a feature of interest in the first video stream in response to periodically executing a feature detection algorithm on the video stream and of the first camera; and generate a notification in response to determining that the detected feature of interest at least partially overlaps with the polygonal area of interest; and receiving, from the feature detection component, the notification of the detected feature of interest.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1:
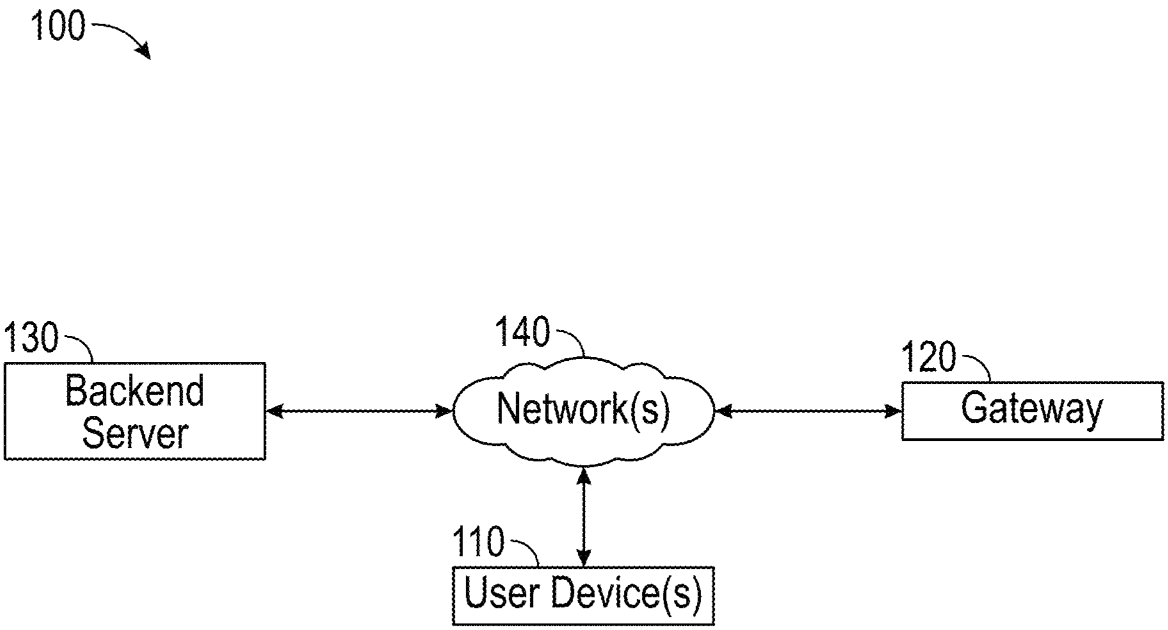
FIG. 1 is a block diagram of an example gateway system in communication with a backend server and a user device.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Camera: an electronic device that includes one or more sensors configured to obtain video data and/or audio data. The cameras may be in communication with a local and/or cloud gateway system, via one or more wired and/or wireless connections, such as via a local area network.

Event Data: data associated with an event, such as a set of sensor data (e.g., metadata and/or asset data), such as photographs, video files, etc., associated with a detected event.

Feature detection: a computerized process that processes video and/or image data, such as to identify features in one or more images of the video data. An indication of a detected feature may be provided to one or more event models to determine if an event/feature of interest is detected. Feature detection may be performed by a local and/or cloud gateway system to detect events of interest, such as safety events.

Event Model (or "triggering criteria"): a set of logic that may be applied to sensor data to determine when an event has occurred. An event model may be, for example, an algorithm, statistical model, or neural network that takes as input one or more types of sensor data, such as a standard-resolution video stream from each of one or more cameras. An event model may be stored in any format, such as a list of criteria, rules, thresholds, and the like, that indicate occurrence of an event. Event models may also receive input from a feature detection component configured to detect features in video data. Event models may be executed by a local and/or cloud gateway system.

Event models and/or feature detection may be performed by using machine learning components that can be used to assist in identification of features (e.g., a person within a restricted area) that may trigger events. For example, a machine learning component can implement machine learning algorithms or artificial intelligence (AI) to generate and/or update neural networks that are executed by a processor (e.g., at a local and/or cloud site visibility system). In some embodiments, the machine learning component can use one or more machine learning algorithms to generate one or more models or parameter functions for the detections. A feature detection module may comprise a plurality of layered and/or hierarchical models that each produce an output that is pooled together. Further, the feature detection module may comprise a thin layer of models that is independently defined and tunable. The machine learning component can be configured to generate an event model that understands which types of data indicate which types of detections. One or more of these event models may be used to determine an expected value or occurrence based on analysis of received data. In some embodiments, event models can include event detection criteria designated by a user, admin, or automatically. For example, the criteria can indicate which types of detected features to monitor, record, or analyze. By designating specific types of detections, resources (e.g., processing power, bandwidth, etc.) can be preserved for only the types of feature detections desired.

Various types of algorithms may be used by the machine learning component to generate the event detection models (e.g., that perform feature detection and related event detection). For example, certain embodiments herein may use a logistical regression model, decision trees, random forests, convolutional neural networks, deep networks, or others. However, other event detection models are possible, such as a linear regression model, a discrete choice model, or a generalized linear model. The machine learning algorithms can be configured to adaptively develop and update the event detection models over time based on new input received by the machine learning component. For example, the event detection models executed by the gateway system may be regenerated on a periodic basis (e.g., by the cloud site visibility system) as new received data is available to help keep the predictions in the event detection model more accurate as the data is collected over time.

Some non-limiting examples of machine learning algorithms that can be used to generate and update event detection models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naïve Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine learning techniques, copious amounts (such as terabytes or petabytes) of received data may be analyzed to generate models without manual analysis or review by one or more people.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

Area of Interest: Defines the geometry, location, and/or metadata about a specific region of a video stream or image, such as a region of an image for which particular feature detections should trigger a notification. For example, areas of interest may be used in conjunction with feature detection to trigger alerts/notifications on only parts of the video stream (e.g., when a particular feature is detected within a user defined area of interest). Areas of interest can be user defined and have a polygonal shape.

II. Example Operating Environment

FIG. 1 illustrates a block diagram of an example operating environment in which one or more aspects of the present disclosure may operate, according to various embodiments of the present disclosure. The operating environment 100 may include one or more user devices 110, gateway 120, and backend server 130. The various devices may communicate with one another via, for example, a communications network(s) 140, as illustrated.

In the example of FIG. 1, the gateway 120, which may also be referred to as a local site visibility system, video gateway, or gateway system, communicates with one or more cameras at or near a target environment, such as a worksite. The gateway 120 captures images of the worksite via the one or more cameras. Depending on the implementation, cameras may communicate with the gateway 120 via wired and/or wireless connections.

The gateway 120 may comprise a housing including processor(s), memory, light source(s), controller(s), and/or the like. In some implementations, one or more sensors may be configured to communicate with the gateway 120. Sensors may include, for example, optical (e.g., cameras), temperature, moisture, motion, distance, and/or the like sensors, which may be installed at the worksite and may be configured to communicate with the gateway 120 either wirelessly or via a wired connection. A worksite may represent a single room, such as a workroom of a manufacturing facility, a warehouse, and/or the like, or may represent multiple rooms, buildings, and/or outdoor areas. For example, in some embodiments, the worksite includes multiple buildings and/or outdoor areas associated with a particular entity, such as a business campus of a company that includes multiple buildings and outdoor locations.

Images and data may be stored in a memory of the gateway 120 (e.g., a computer readable storage medium). The images and data may be automatically transmitted from the gateway 120 to, for example, the backend server 130 (also referred to as the "cloud" or "cloud server" herein). The backend server 130 may thereby receive images and data from multiple gateways 120 and may aggregate and perform analyses on the images from multiple gateways 120.

The backend server 130 may communicate with the gateway(s) 120 to enable remote, rapid configuration of the gateway(s) 120. Such configuration may be accomplished via interactive graphical user interfaces provided by the backend server 130 and accessible by the user device(s) 110, for example. Via the backend server 130, and/or directly by communication with the gateway 120, user device(s) 110 may access real-time views of status, image analysis, etc. of the gateway 120. Communications with the gateway 120 may be accomplished via webservers executing on the gateway 120 themselves.

In some embodiments, the feature and services provided by the backend server 130 may be implemented as web services consumable via the network(s) 140. In further embodiments, the backend server 130 is provided by one or more virtual machines implemented in a hosted computing environment. The hosted computing environment may include one or more rapidly provisioned and released computing resources, which computing resources may include computing, networking and/or storage devices.

In general, the user devices 110 can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A user device 110 may execute an application (e.g., a browser, a stand-alone application, etc.) that allows a user to access interactive user interfaces, view images, analyses, or aggregated data, and/or the like as described herein. In various embodiments, users may interact with various components of the example operating environment 100 (e.g., backend server 130, the gateway 120) via the user device(s) 110. Such interactions may typically be accomplished via interactive graphical user interfaces, however alternatively such interactions may be accomplished via command line, and/or other means.

The network 140 may include any wired network, wireless network, or combination thereof. For example, the network 140 may be a personal area network, local area network, wide area network, over-the-air broadcast network (e.g., for radio or television), cable network, satellite network, cellular telephone network, or combination thereof. As a further example, the network 140 may be a publicly accessible network of linked networks, possibly operated by various distinct parties, such as the Internet. In some embodiments, the network 140 may be a private or semi-private network, such as a corporate or shared intranet. The network 140 may include one or more wireless networks, such as a Global System for Mobile Communications (GSM) network, a Code Division Multiple Access (CDMA) network, a Long Term Evolution (LTE) network, or any other type of wireless network. The network 140 can use protocols and components for communicating via the Internet or any of the other aforementioned types of networks. For example, the protocols used by the network 140 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Further details and examples regarding the implementations, operation, and functionality, including various interactive graphical user interfaces, of the various components of the example operating environment 100 are described herein in reference to various figures.

III. Example User Interface

Figure 2:
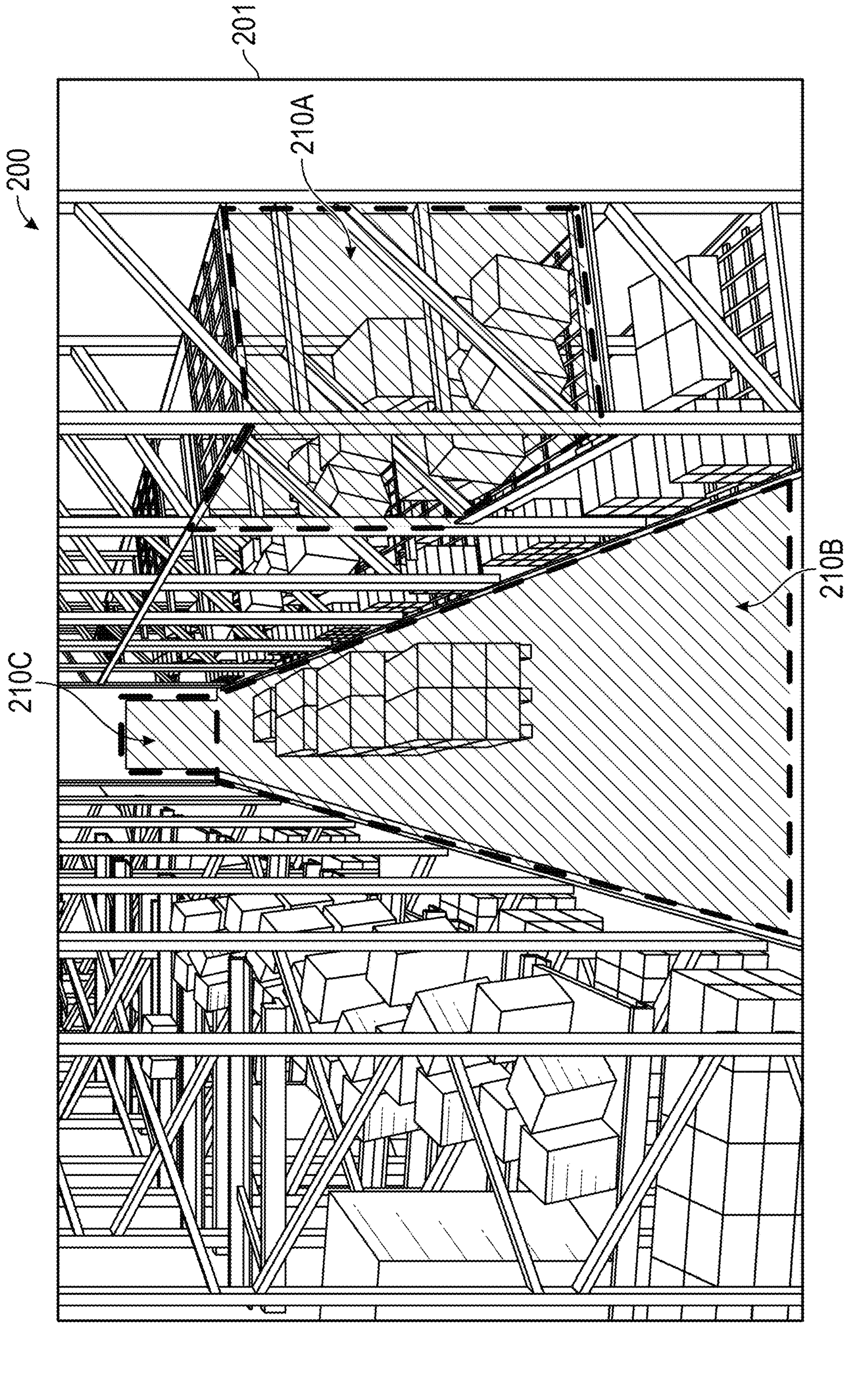
FIG. 2 is an example interactive user interface that may be displayed on a user device.

FIG. 2 illustrates an example interactive user interface 200 that may be displayed on the user device 110. In the example of FIG. 2, a video still from a worksite is displayed. The video still may be acquired from a camera at the corresponding worksite. For example, the gateway 120 may provide one or more video stills from a camera that is in communication with the gateway 120 (e.g., one of a plurality of cameras at a work site), so that the user device 110 may receive input from a user to define areas of interest within the field of view of the particular camera.

The interactive user interface 200 displays a video still 201 from a camera and includes user interface functionality that allows a user to define the three example user defined polygonal areas of interest ("AOI") 210A, 210B, and 210C. For example, AOI 210A defines a shelf in the warehouse as the area of interest, AOI 210B defines the walkway of the warehouse as the area of interest, and AOI 210C defines the doorway of the warehouse as the area of interest. As described further herein, users can select different areas of interest on a user interface, such as, interactive user interface 200. As discussed further herein, these areas of interest may be compared with features that are detected in a video stream of the worksite to determine whether a detected feature is within the areas of interest and, therefore, may trigger an event alert.

In some embodiments, the video still and a corresponding video stream that are requested by a user, are received at the user device 110 from the gateway 120. In some embodiments, the video still and/or corresponding video stream are received from the gateway 120 and/or backend server 130. In some embodiments, certain video streams and/or related metadata may be received from the gateway 120, while other types of video streams and/or related metadata may be received from the backend server 130. While FIG. 2 illustrates a video still 201 from one camera, the interactive user interface 200 may display more than one video still and/or video stream from one or more different cameras.

In some embodiments, the video stills are displayed on the interactive user interface 200 while the user configures the AOI and are replaced with live video streams from the corresponding camera once the user has input the desired PAOI for monitoring. For example, a user could select the image displayed on the interactive user interface 200 to initiate display of a video stream in a new window, or replacing the video still shown in FIG. 2.

The gateway 120 may also communicate with the backend server 130, such as to provide sensor date (e.g., video stream and/or other sensor data) for further analysis, such as to determine whether triggered alerts are accurate and to generate updated models for triggering such alerts.

In some embodiments, the gateway 120 may include a sensor interface, which generally is any hardware and/or software components that are configured to communicate with sensors, such as cameras, smart sensors, and/or the like. In some embodiments, the gateway 120 may include sensor data storage, which stores video streams received from cameras. For example, the sensor data storage may be configured to store a certain rolling time period (e.g., the last 48 hours) of high-resolution and standard-resolution video data, and another longer rolling time period (e.g., the last 96 hours) of low-resolution video data. The sensor data storage may include one or multiple storage devices, such as hard drives, servers, and/or server farms to facilitate storage of the sensor data. In some embodiments, certain sensor data may be offloaded from the sensor data storage to a storage system associated with the backend server 130. For example, certain snippets of video data associated with any detected event, e.g., 30 seconds before and 30 seconds after, may be stored by the cloud site visibility system 230 for some longer time (e.g., six months or longer).

The gateway 120 and/or the backend server 130 may include an AI processing component that generally performs feature detection on the sensor data, e.g., video data from the cameras and/or other sensor data from the smart sensors, such as to identify events of interest. For example, an event of interest at a warehouse facility might be to indicate that a person is active in an area of interest such as, for example, the warehouse floor, which may be determined by, for example, an analysis of the video stream from one or more cameras having the warehouse facility within their field of view. Feature detection that is performed by an AI processing component may include machine learning, neural network, and/or other artificial intelligence algorithms that generate and/or update models for detection of certain events. For example, in some embodiments, users may provide feedback on accuracy of identified features and/or events. For example, a user may indicate that video data associated with a "person on the warehouse floor" event that was detected by the AI processing component does not actually show a person on the floor, but rather shows a large object blocking much of the cameras view of the warehouse facility. With this feedback, the AI processing component may update and/or optimize a feature detection model for triggering a person on the warehouse floor event so that similar false positive event detections do not occur in the future.

In some embodiments, the backend server 130 includes an AI processing component in addition to or instead of an AI processing component of the gateway 120. The backend server 130 AI processing component may be more robust than the AI processing component of the gateway 120. Thus, in some embodiments, model optimization is performed at the backend server 130, such as based on one or more video streams that are provided by the gateway 120.

In some embodiments, the gateway 120 may include a communication component, which may be configured to communicate with one or more external devices, such as the backend server 130, user device(s) 110, and/or the like. In some embodiments, the communication component provides sensor data, such as video streams from one or more cameras, to the user device(s) 110, such as at the request of the user of the user device(s) 110.

IV. Example AOI Flowchart

Figure 3:
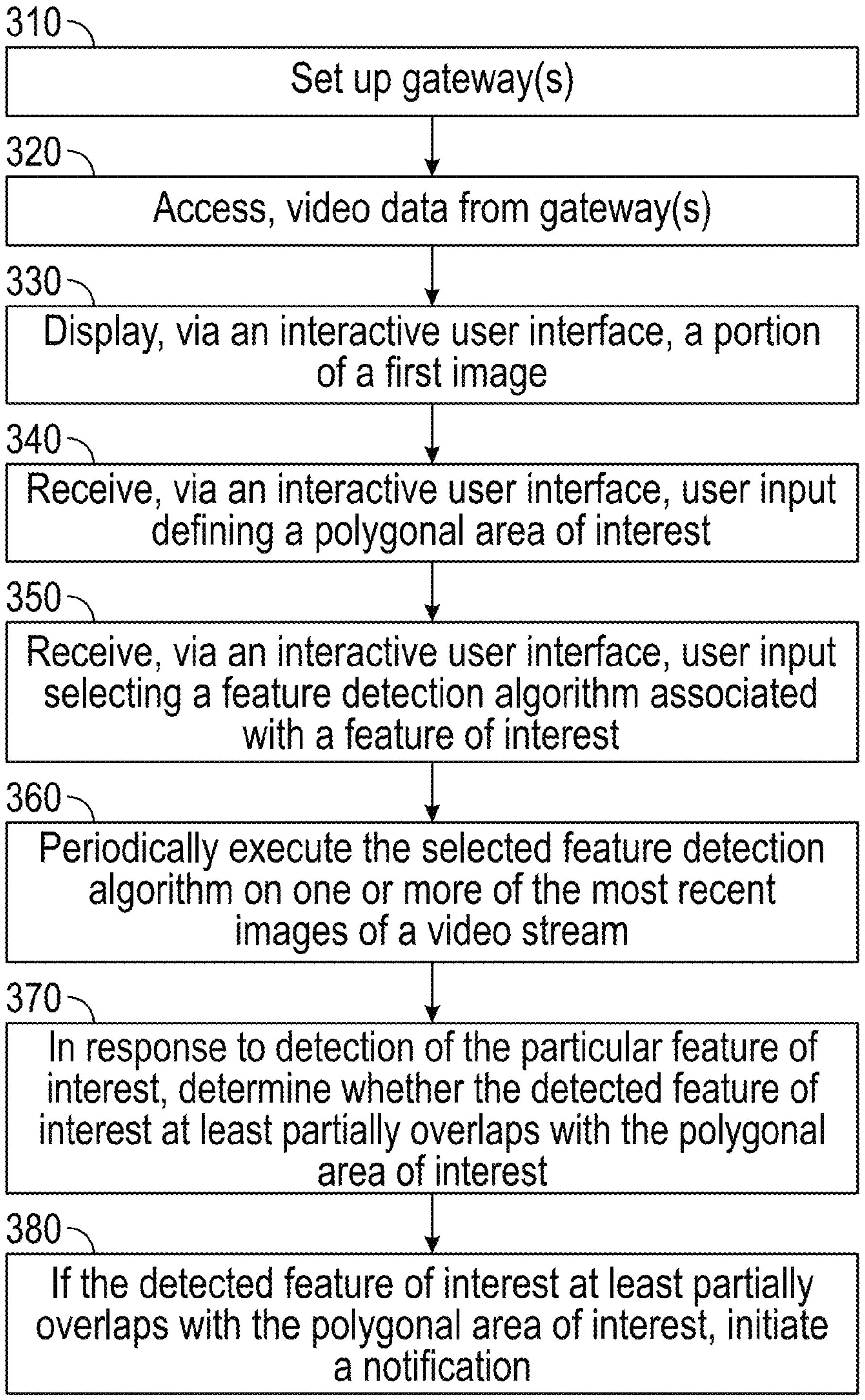
FIG. 3 is a flowchart illustrating an example of one embodiment of a process that may be performed by a gateway system, a backend server, and/or a combination of the two.

FIG. 3 illustrates a flowchart of an example of one embodiment of a process that may be performed by a gateway 120, a backend server 130, and/or a combination of both. In other embodiments, the method may include fewer and/or additional blocks and/or the blocks may be performed in order different than as illustrated. For ease of explanation, the process of FIG. 3 is discussed below with reference to communications with a single camera. However, the same or similar process may be performed for each of multiple cameras in communication with the backend server 130, such as multiple cameras at a particular worksite.

Beginning at block 310, one or more cameras are configured to communicate video data with a gateway 120. For example, a camera may be positioned in view of a target environment (e.g., a worksite) where feature detection is to be performed. In some embodiments, certain cameras may transmit one or more video streams constantly to the gateway 120, while other cameras may transmit only portions of video streams to the gateway 120. For example, the user may configure certain cameras to transmit video data during only certain hours and at only certain resolutions. Thus, for example, a camera may be configured to transmit multiple resolutions of video streams during a first time period, and to not transmit any video streams during another time period.

In some embodiments, the gateway 120 may maintain, either permanently or temporarily, a communication link with the backend server 130 also. For example, in some embodiments when the gateway 120 is first powered on at the environment, the backend server 130 may be configured to establish a communication link, either wired or wireless, with the gateway 120. Additional details regarding camera registration processes are discussed in related U.S. provisional application No. 63/363,150, titled "VIDEO GATEWAY FOR CAMERA DISCOVERY AND AUTHENTICATION," filed Apr. 18, 2022, which is hereby incorporated by reference in its entirety and for all purposed.

Next, at block 320, the gateway 120 provides one or more images of a video stream of a camera to a user device, such as in response to a request for video stream data from the camera by a user, for example to establish one or more areas of interest for that camera. A video stream from a camera generally includes a plurality of images, each having a common coordinate space (e.g., the field of view of the camera is consistent). As described further herein, because a user is interested in detecting events within a particular coordinate space, the gateway 120 maintains the position of the camera to obtain a consistent video stream of the same target environment.

In some embodiments, if video stills and/or a video stream (generally referred to herein as "video data") that is requested by the user device is not available at the gateway 120, the gateway 120 may request the video data from the backend server 130 on-demand. The backend server 130 is configured to store portions of the video data from the camera (and other cameras and/or sensors in communication with gateway 120).

In some embodiments, communications with the gateway 120 to receive video data, e.g., for determining areas of interest, may be accomplished via communication with the backend server 130. For example, if the user device is remote from the worksite, the system may be configured to allow the user device to communicate with the backend server 130, which can then interact with the gateway 120, as needed. In this example, a video stream may only be transmitted to the backend server 130, from the gateway 120, upon request for the video stream from the user device 110. For example, a user device 110 may open an interactive user interface for display of the video stream from the gateway 120, and the backend server 130 may correspondingly request transmission of the video stream from the gateway 120. In some embodiments, the video stream may be continuously streamed and stored, such as on a local or networked storage device, for a particular time period and/or using a particular amount of storage space. For example, a predetermined amount of storage space may be allocated for video streams from all of the cameras associated with a gateway 120 (or multiple gateways associated with a particular entity) and/or individual video storage limits for individual cameras.

Next, at block 330, an interactive user interface is displayed on the user device 110. The interactive user interface includes a first image from the plurality of images of the target environment. The first image comprises a video still or at least a portion of the video still of the target environment received from the gateway 120. For example, as shown in FIG. 2, the interactive user interface 200 displays a video still of a warehouse, where the warehouse is the target environment.

Next, at block 340, the backend server 130 receives, via the interactive user interface, user input defining an AOI overlapping at least a portion of the first image. As described with reference to FIGS. 4-6, users may define AOIs in numerous different ways. An AOI may be defined by multiple vertices that are defined by coordinates within the coordinate space, such as, for example, 1, 2, 3, 4, 5, 10, 15, 20, 30, and/or the like coordinates. For example, as shown in FIG. 2, AOI 210A includes six coordinates, AOI 210B includes four coordinates, and AOI 210C includes four coordinates. Coordinates, as the term is used herein, may refer to the vertices of an AOL. In some embodiments, the common coordinate space may be defined by horizontal units (e.g., x) and vertical units (e.g., y). In this example coordinate system, each coordinate of an AOI includes an x horizontal unit and a y horizontal unit relative to the common coordinate space. Because the gateway 120 maintains the position of the video stream, the coordinates of an AOI is maintained for the continuous video stream. AOI coordinates may be stored in a database associated with the backend server 130.

Next, at block 350, one or more feature detection algorithms may be automatically or manually selected. For example, in some embodiments an organization may enable a person detection algorithm for all of its cameras and gateways. Thus, for any camera associated with that organization, a person detection model may automatically be selected for all camera video streams. In some embodiments, an authorized user is able to customize feature detection algorithms to be applied to certain environments, cameras, video streams, and/or portions of video streams.

A feature detection algorithm may include one or more event models. For example, a feature of interest may include a particular activity occurring within the target environment, such as, for example, a spill in the target environment. In another example, a feature of interest may include a particular type of equipment in the target environment. Continuing with the example of a warehouse as the target environment, a feature of interest may be a forklift operating in the warehouse. In another example, a feature of interest may include specific types of objects in the target environment, such as, for example, animals, pets, humans, machines, and/or the like. In yet another example, a feature of interest may include objects in the blind spot of a vehicle. For example, a camera may be to obtain a video stream of a blind spot of a large commercial vehicle (such as the back of the vehicle), and feature detection algorithm that identifies objects such as vehicles, bikes, people, animals, and/or the like may be selected for the video stream. In the blind spot example, the video stream may be constantly changing as the large commercial vehicle moves, however, the common coordinate space is maintained.

Figure 7:
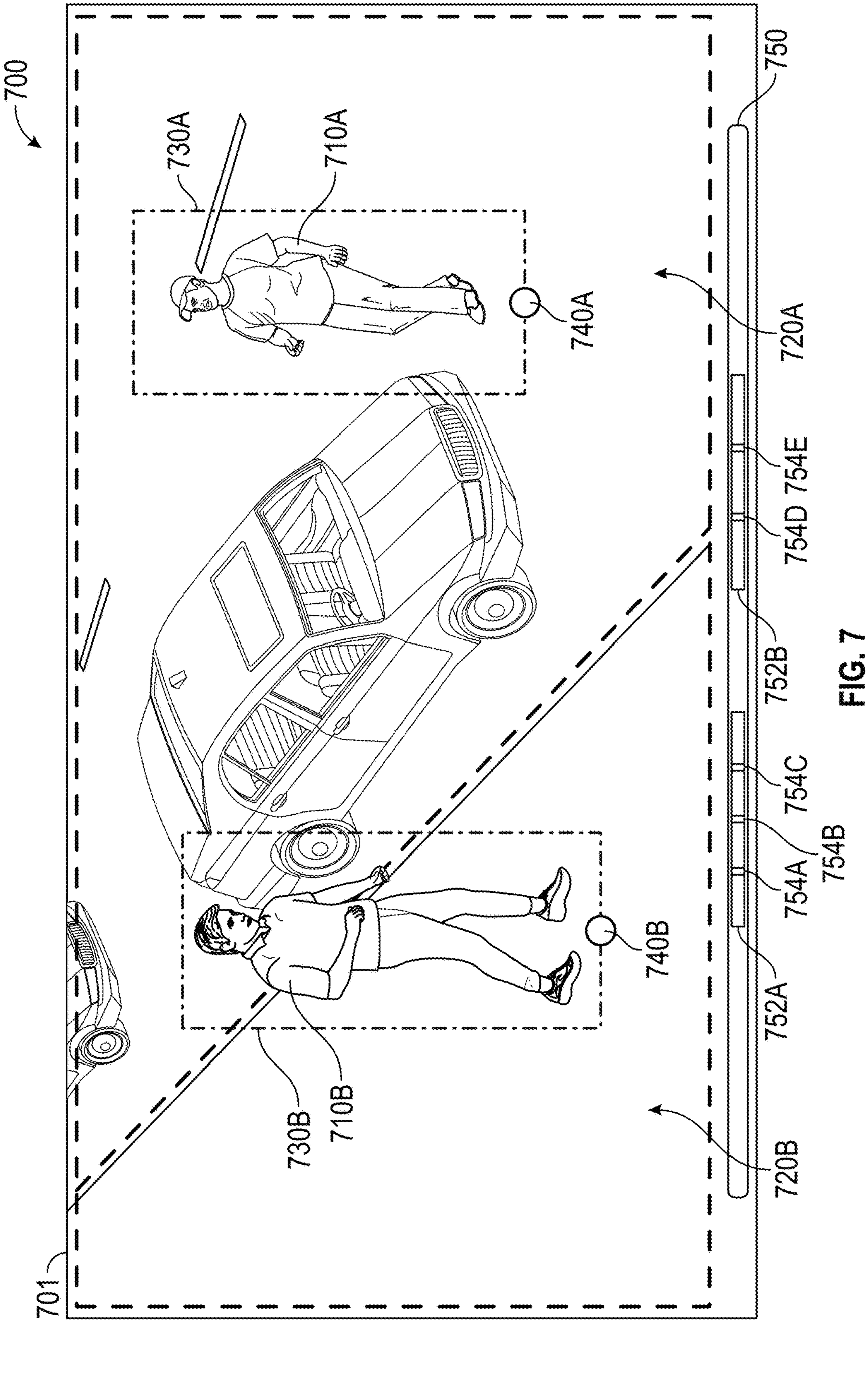
FIG. 7 is an example interactive user interface illustrating the bounding areas of detected features.

Moving to block 360, a feature detection component of the gateway 120 and/or backend server 130 periodically (or continuously) executes the appropriate feature detection algorithm(s) on corresponding video stream, e.g., one or more of the most recent images of the video stream. The feature detection component may be being configured to output feature coordinates within the coordinate space of a particular camera in response to detection of a feature of interest. For example, feature coordinates of a detected feature may define a bounding area of the detected feature within the field of view of the particular camera. Depending on the feature detection algorithm, the bounding area may include, for example, a rectangle (e.g., a "bounding box"), a circle, an oval, or any regular or irregularly shaped polygon. In some embodiments, the feature of interest may be entirely within the bounding area. For example, as shown in FIG. 7, where the feature of interest is a human, the feature detection algorithm generates bounding areas 730A and 730B, each including four feature coordinates defining the vertices of the bounding area. In some embodiments, such as based on settings and/or constraints of the artificial intelligence that executes the feature detection algorithms, a feature of interest may partially extend beyond a bounding area, such as having about 10%, 20%, or some other portion, extending beyond the perimeter of the bounding area.

Next, at block 370, in response to detection of the particular feature of interest, the feature detection component (and/or other component(s) of the gateway 120 and/or backend server 130) determines whether a bounding area of a detected feature (e.g., a bounding area output by the feature detection component indicating location of a person in the analyzed video data) overlaps with the AOI defined by the user. As discussed further below, the extent of overlap between a bounding area and an AOI may be customized based on user settings and/or machine learning techniques. For example, event detection rules may be customized to indicate the extent (e.g., physical and/or temporal) of overlap of a feature of interest with one or more AOIs. For example, an event detection rule may indicate detection of an event only if feature coordinates of a detected feature are all within the AOI, while another event detection rule may indicate detection of an event if any of the lines of the bounding area intersect any boundary of the AOL. Another event detection rule may indicate detection of an event if any of the feature coordinates of a detected feature (e.g., one or more vertices of a bounding area associated with a detected feature) are within an area defined by the AOL. Another event detection rule may indicate detection of an event if any of the AOI coordinates (e.g., vertices of the AOI) are within the bounding area of a detected feature. In some embodiments, one or more of the event detection rules may be applied and the event detection rules may be applied in a specific order to, for example, minimize the processing power of the calculation. In some embodiments, a single event detection rule may trigger an event notification in response to overlap of multiple detected features with a corresponding multiple AOIs, and/or may depend on video streams (and corresponding feature detections and AOIs within the multiple video streams) from multiple cameras.

Next, at block 380, if the feature detection component (and/or other component(s) of the gateway 120 and/or backend server 130) determines that a bounding area of a detected feature overlaps with the AOI defined by the user, the feature detection component (and/or other component(s) of the gateway 120 and/or backend server 130) determines that an event has occurred and initiates a notification. Depending on the embodiment, an event may be associated with one or multiple detected feature's bounding areas overlapping with the AOL. For example, an event may only be triggered when each of two different feature's bounding areas are determined to overlap with the AOI within a certain time period, while another event may be triggered by detection of only the bounding area of a single detected feature overlapping with the AOL. For example, where a warehouse is a target environment, an event may not be triggered when the bounding area of a machine (a first detected feature) is determined to overlap with an AOI defining the warehouse floor. However, an event may be triggered when both the machine's bounding area and the bounding area of a human (a second detected feature) are determined to overlap with the AOI defining the warehouse floor within a certain period of time. In another example, an event may be triggered when a first detected feature's bounding area overlaps with a first AOI and a second detected feature's bounding area overlaps with a second AOI within a certain time period.

As described above, once an event has occurred, the gateway 120 and/or backend server 130 initiates a notification. Notification, as the term is used herein, is a broad term and may include, for example, any type of alert, such as a sound, electronic message, text, email, phone call, alarm, and/or the like. Notifications may be transmitted to the user device 110. Depending on the system and environment where the event detection is taking place, a notification may trigger a custom workflow, which may be executed by the backend server 130, the gateway 120, and/or another computing system. In one example, a portion of a workflow may include initiating a live stream display of the target environment where the event was detected. In another example, a portion of a workflow may include saving event data to a database associated with the gateway 120, the backend server 130 and/or the user device 110 for the time surrounding and including the event. For example, event data may include a customizable amount of time (e.g., 30 seconds) prior to the bounding area of a detected feature being determined to overlap with the AOI, the duration of the time the bounding area overlaps with the AOI, and a custom customizable amount of time (e.g., 30 seconds) after to the bounding area is determined to no longer overlap the AOL. In some embodiments, a description of the event may also be associated with the event data based on the feature of interest detected. In some embodiments, a portion of a workflow may include a safety response to the detected event. For example, where an event indicates an emergency such as a spill, fire, and/or the like, a portion of the workflow may include communication with emergency services.

In some embodiments, after the feature detection component of the gateway 120 and/or backend server 130 determines that an event has occurred and a notification is initiated, the feature detection component continues to execute the selected feature detection algorithm on one or more of the most recent images of the video stream and continues to output feature coordinates within the coordinate space in response to detection of the particular feature of interest. The feature detection component may determine that an event is occurring for the duration of the time the bounding area of the detected feature overlaps with AOL. The feature detection component may determine that the event is complete after determining that the bounding area of the detected feature no longer overlaps with the AOL. In some embodiments, a custom workflow (such as a live video stream) may be executed for the duration of the event. In some embodiments, event data may be stored in a database for the time surrounding and including the event. In some embodiments, event data may be stored for the time surrounding and including the duration that the particular feature of interest is detected. For example, the event data would include the entire duration the feature detection component determines that a feature of interest is in the video stream, including the event.

In some embodiments, each discrete event may be shown on an activity page associated with the system and displayed on an interactive user interface of user device 110. In some embodiments, events may be displayed as a continuous aggregate on a timeline, which may be displayed as a video bar on the interactive user interface as discussed in FIG. 7. In some embodiments, events are quarriable in data bricks and may include the following properties: event start time, event end time, detections present (e.g., metadata about the detection and/or a method to join the detection against metadata tables), the AOI intersections, and/or the like.

V. Example Methods of Defining AOI Coordinates

FIGS. 4A-4J illustrate an example drawing tool method of defining an AOI on an interactive user interface 400. In the examples of FIGS. 4A-4J, a video still from a target environment is displayed. As described above in FIG. 3, the video still may be acquired from a camera at the corresponding target environment. For example, the gateway 120 may provide one or more video stills from a camera that is in communication with the gateway 120 (e.g., one of a plurality of cameras at a work site), so that the user device 110 may receive input from a user to define an AOI within the field of view of the particular camera. For example, the user may use a mouse to define the coordinates of a desired AOL. While the method described with reference to FIGS. 4A-4J describes certain steps, it is recognized that in other embodiment, the method may include fewer and/or additional steps and/or the steps may be performed in order different than as illustrated. For ease of explanation, the process of FIG. 4A-4J is discussed below with reference to defining a single AOI on a single video still. However, the same or similar process may be performed to create any number of AOI on the video still and to define one or more AOI on multiple video stills corresponding to multiple cameras/gateways 120 in communication with the backend server 130, such as multiple cameras at a particular worksite.

Figure 4A:
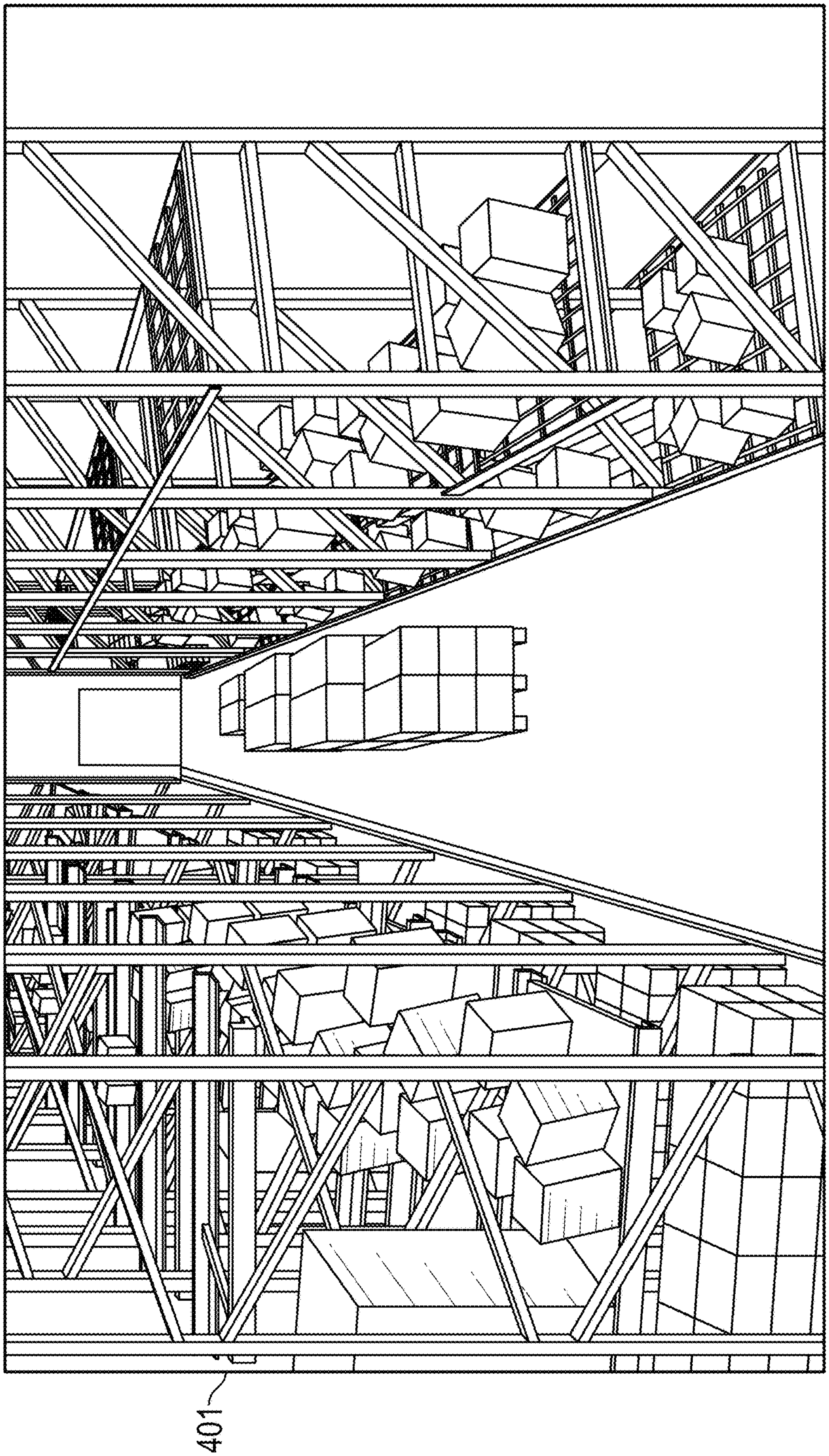
FIG. 4A-4J are example interactive user interfaces illustrating an example method of defining a polygonal area of interest.

FIG. 4A illustrates a first image 401 displayed on the interactive user interface 400. As described in blocks 320 and 330 of FIG. 3, the gateway 120 provides one or more images of a video stream of a camera to the user device 110, where the camera is positioned to obtain a video stream of the target environment. The video stream from the camera generally includes a plurality of images, each having a common coordinate space (e.g., the field of view of the camera is consistent). The first image 401 comprises a video still or at least a portion of the video still of the target environment received from the gateway 120. In the example of FIGS. 4A-4J, the target environment is a warehouse including a floor, a doorway, numerous shelves and boxes, etc.

Figure 4B:
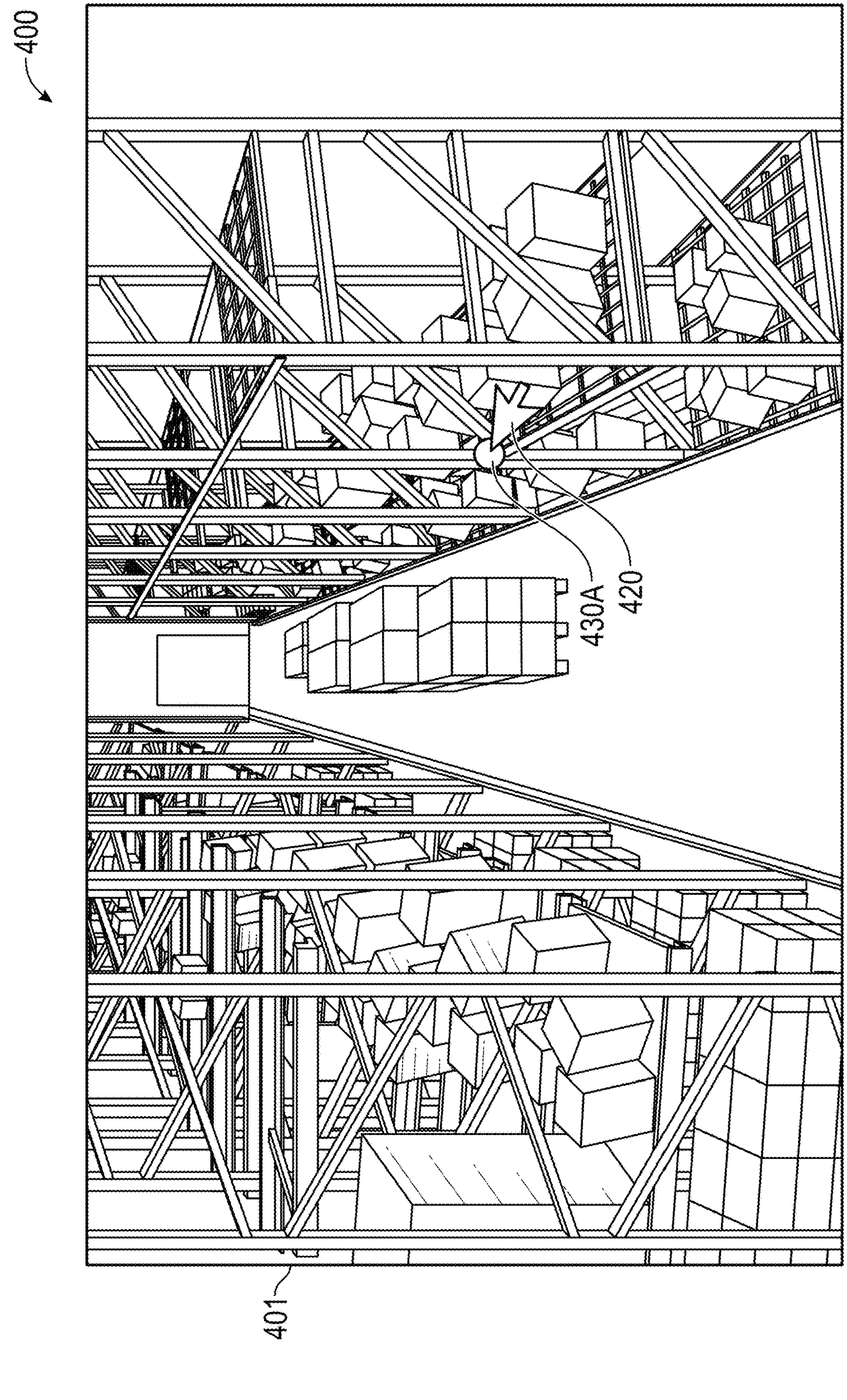

FIG. 4B-4J continue to illustrate the first image 401 displayed on the interactive user interface 400. Using a mouse or another control system, a user is able to control the location of a cursor 420 on the interactive user interface 400. When the user clicks on a location in the first image 401 displayed in the interactive user interface 400 (e.g., left clicks using a mouse, touches using a stylus or a finger, and/or the like), a node (e.g., first node 430A) is generated and displayed. A node comprises a graphical representation of a potential coordinate of an AOL. For example, as a non-limiting example, the first node 430A is displayed as a circular image. As shown in FIG. 4B, a user has positioned the cursor 420 such that the cursor 420 is located at the corner of a shelf the user wishes to define as an AOL. By clicking the cursor 420 at that location, a first node 430A has been generated on the interactive user interface 400. A node generated on the interactive user interface 400 includes specific coordinates relative to the common coordinate system such as, for example, an x horizontal unit and a y horizontal unit relative to the common coordinate space.

Figure 4C:
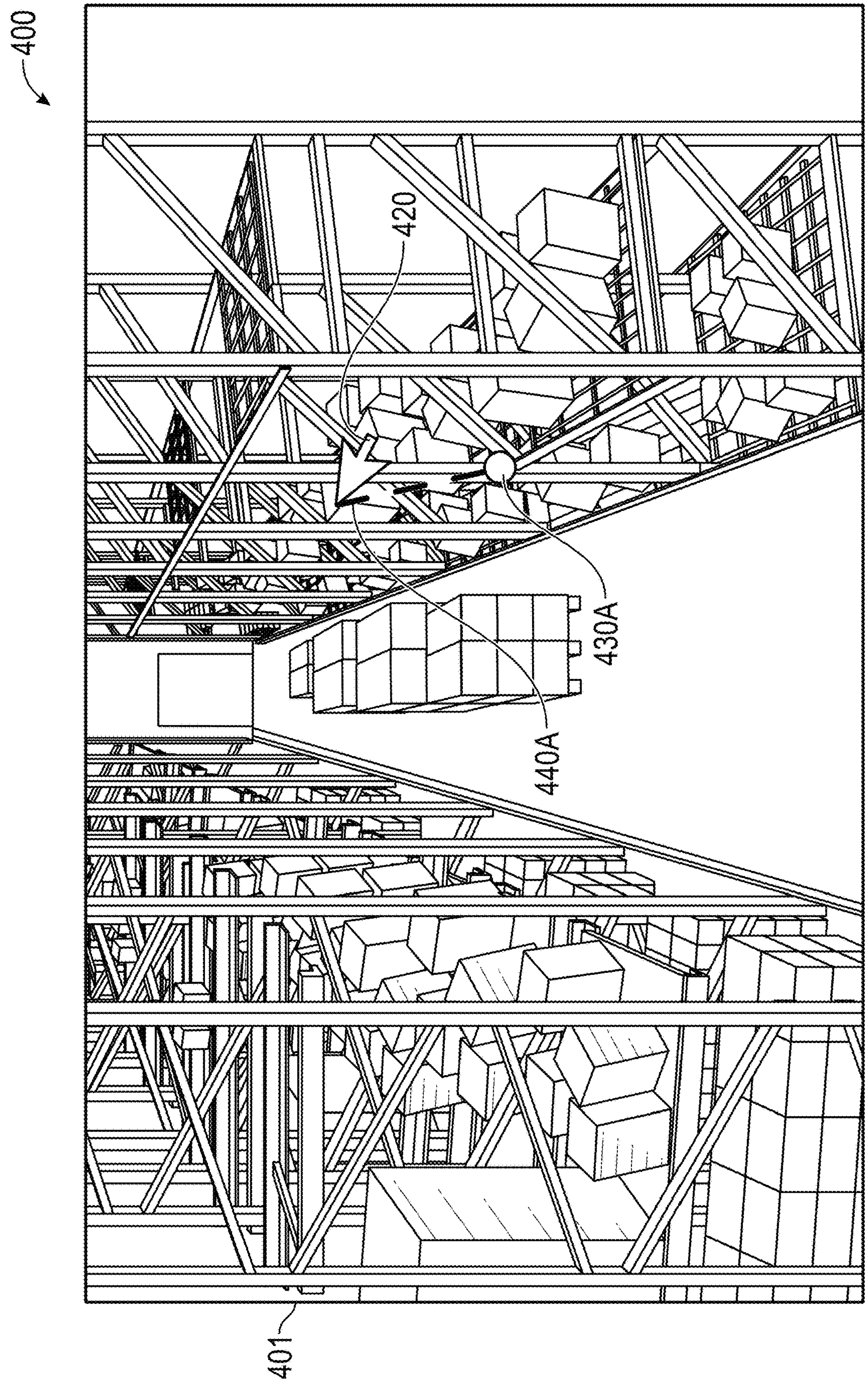

FIG. 4C illustrates the first image 401 displayed on the interactive user interface 400 following the users' activities in FIG. 4B. In FIG. 4C, the user has moved the cursor 420 away from the first node 430A. Once a first node is generated, a line anchored to the first node on one end and anchored to the cursor 420 on the other end is generated and displayed on the interactive user interface 400. When a subsequent node is created, the line remains anchored to the first node and becomes anchored to the second node, with a new line being generated, the new line being anchored to the cursor 420 and the subsequent node. For example, as shown in FIG. 4C, the user generated first line 440A after the user clicked and placed first node 430A on the first image 401. The user can move the cursor 420 anywhere on the interactive user interface 400 and the first line 440A will continue to follow the location of the cursor 420 while being anchored to the first node 430A. Lines such as 440A may become the lines of an AOL. In some embodiments, users may be able to terminate an unplaced line (such as first line 440A in FIG. 4C) by, for example, right clicking with the mouse.

Figure 4D:
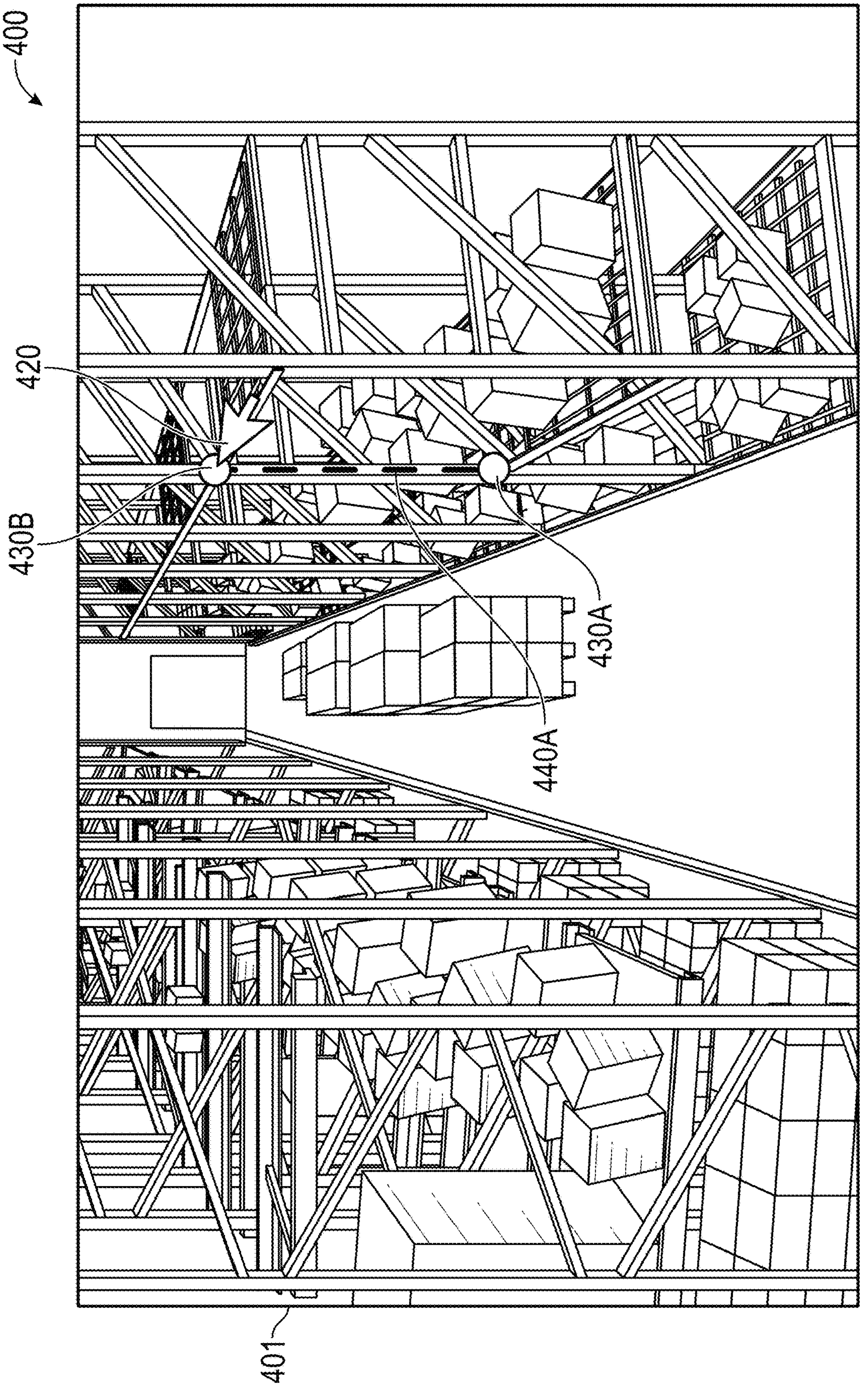
Figure 4E:
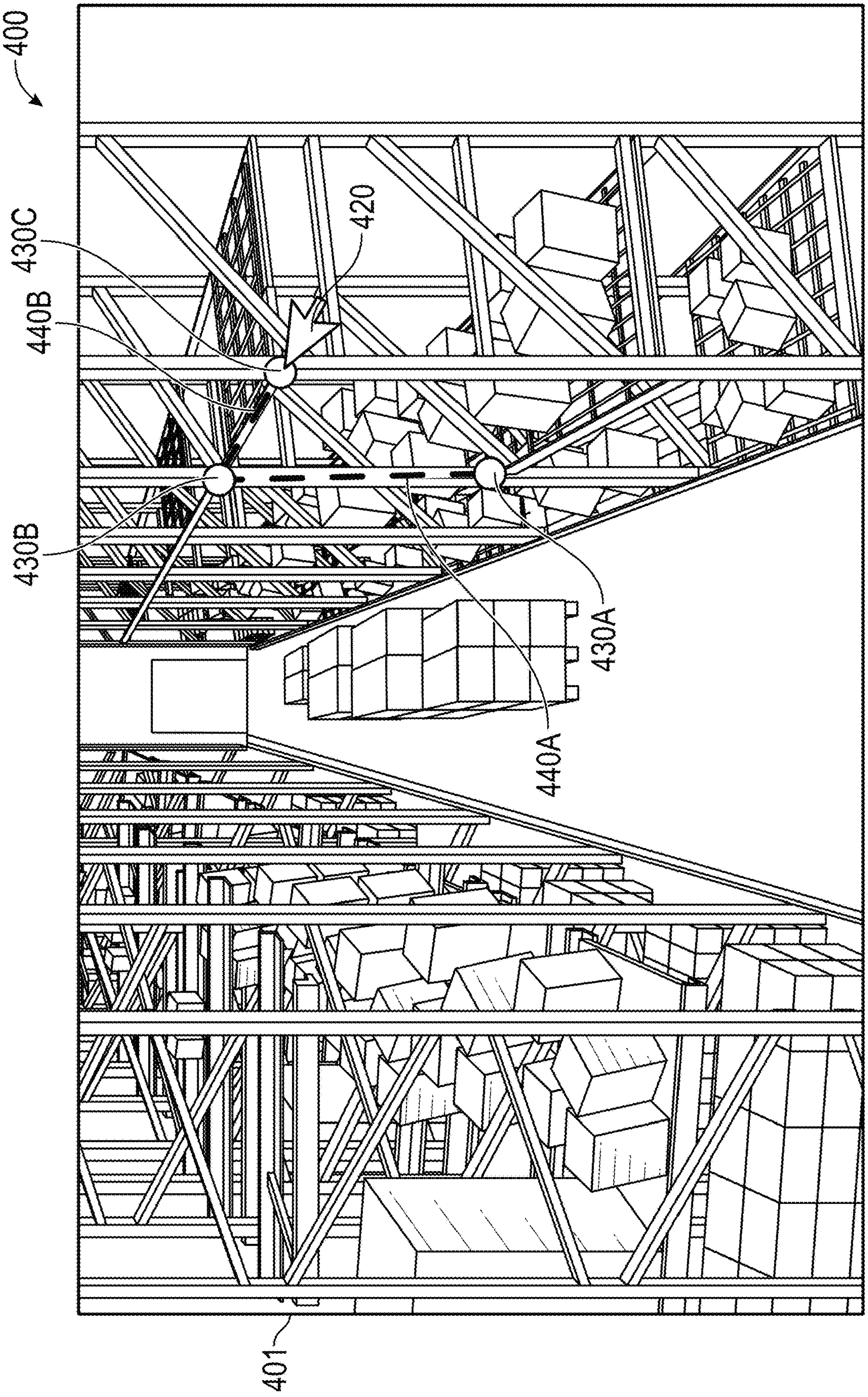
Figure 4F:
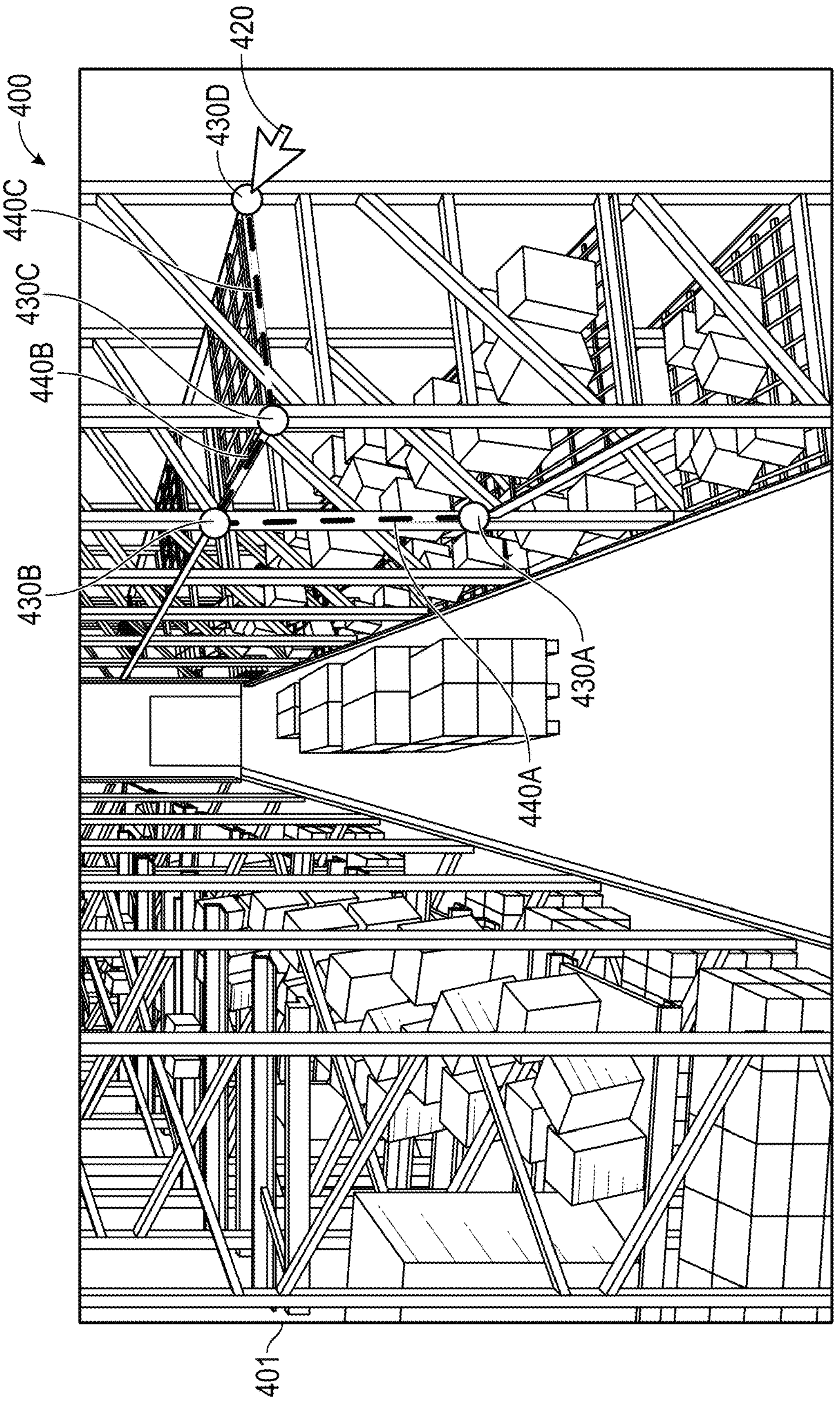
Figure 4G:
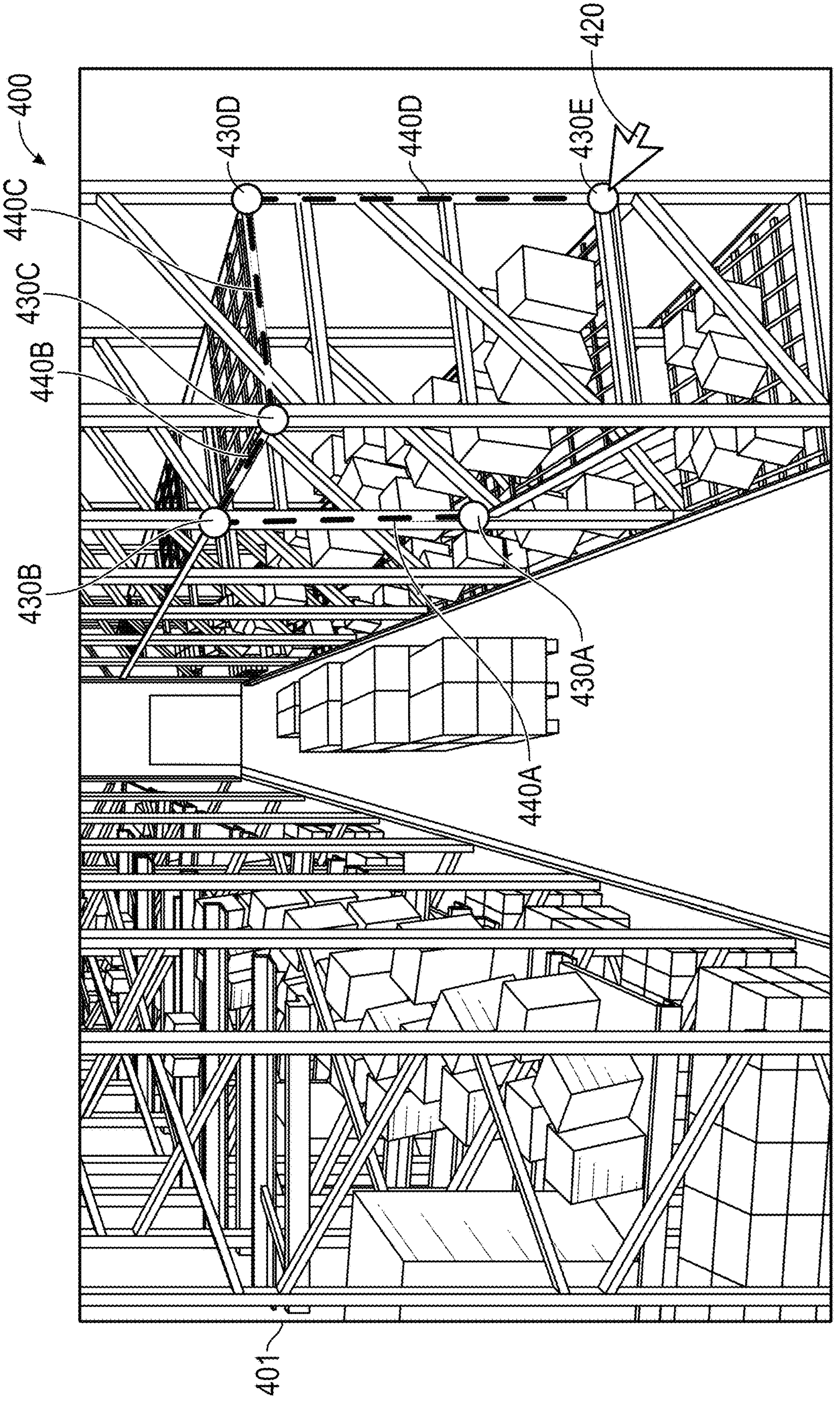

FIG. 4D illustrates the first image 401 displayed on the interactive user interface 400 following the users' activities in FIG. 4C. In FIG. 4D, the user has moved the cursor 420 away from the first node 430A and clicked to generate a second node 430B at a new location in the interactive user interface 400. By generating the second node 430B, coordinates specific to second node 430B are determined and stored in a database of, for example, the gateway 120, the backend server 130, and/or the user device 110. As shown in FIG. 4D, by generating the second node 430B, the first line 440A has become anchored to second node 430B and continues to be anchored to first node 430A. Additionally, by generating second node 430B, a second line 440B (shown in FIG. 4E) is generated, with the second line 440B being anchored to the second node 430B on one end and the cursor 420 on the other end.

Figure 4H:
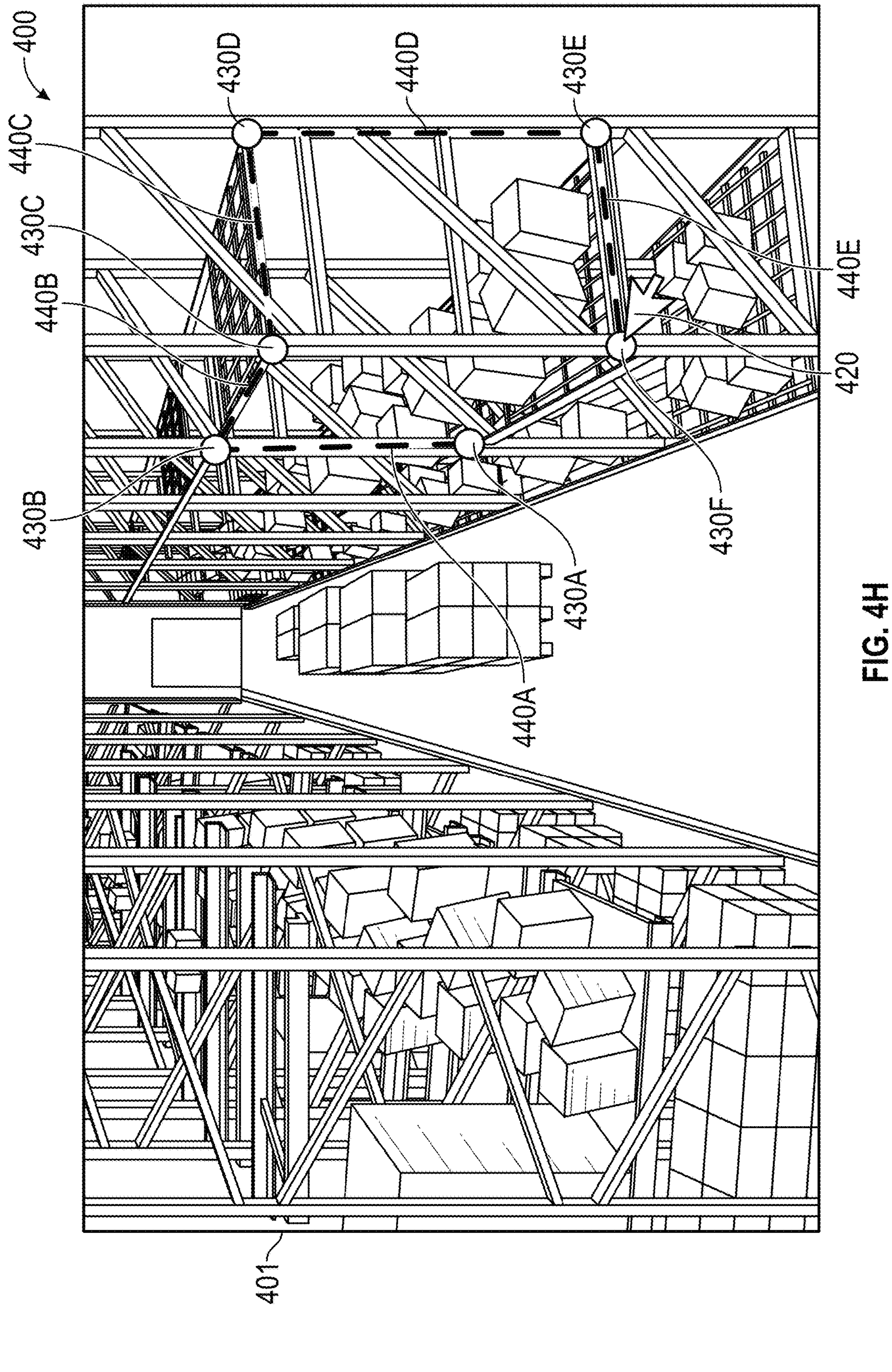

FIG. 4E through FIG. 4H continue to illustrate the first image 401 displayed on the interactive user interface 400 with the user continuing to generate new nodes 430C, 430D, 430E, and 430F, and continuing to generate and anchor lines 440B, 440C, 440D, 440E, and 440F. In FIG. 4H, the user has clicked to generate final node 430F and generated final line 440F (shown in FIG. 4J). As shown, the user has positioned all the vertices (e.g., displayed as nodes) to define an AOI that encompasses the desired shelf in the target environment.

Figure 4I:
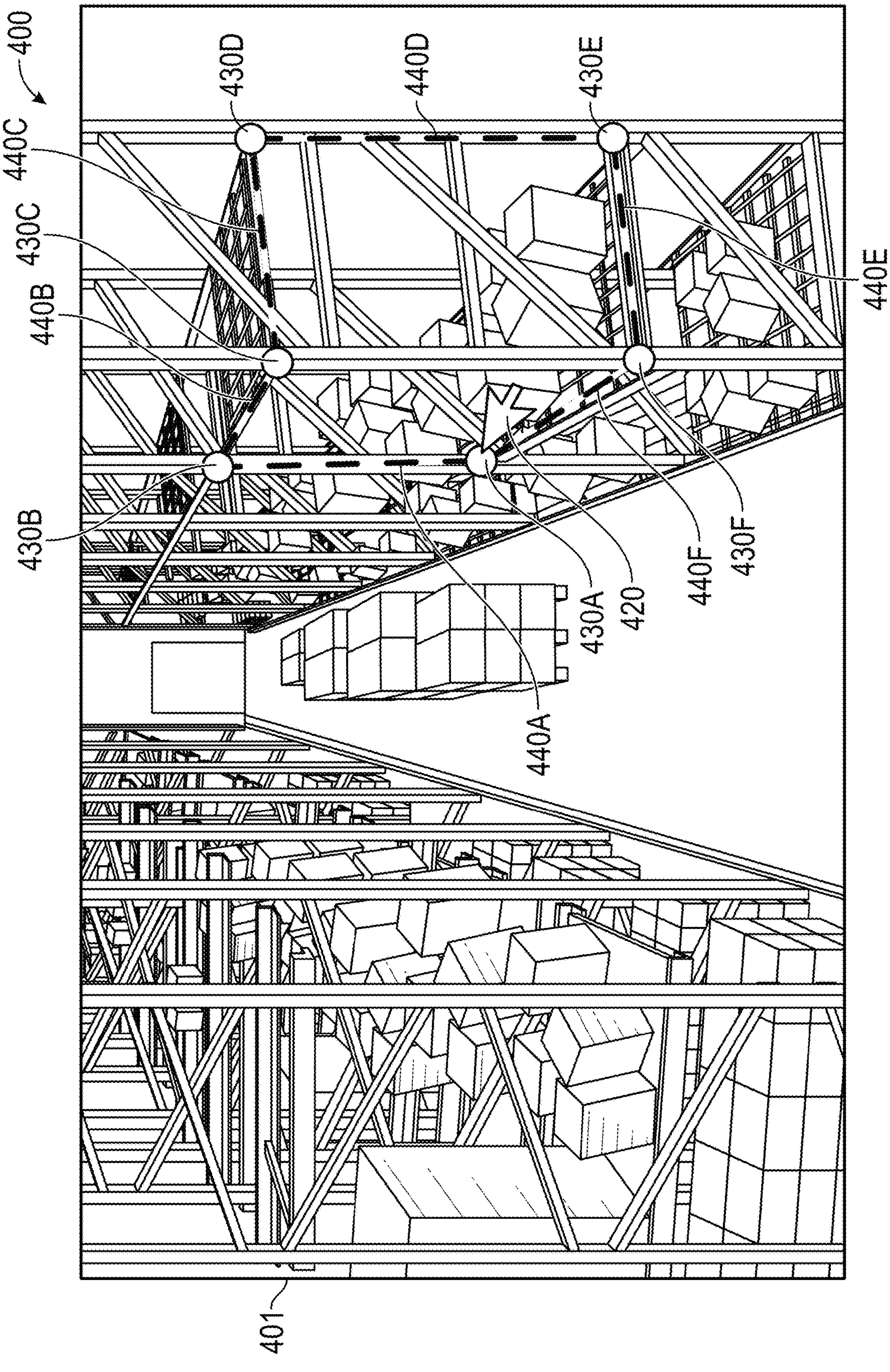

FIG. 4I illustrates the first image 401 displayed on the interactive user interface 400 following the users' activities in FIG. 4H. In FIG. 4I, to complete the AOI, the user uses cursor 420 to select the first node 430A. By selecting first node 430A, line 440F is anchored to first node 430A and final node 430F. By selecting (e.g., clicking on) any existing node, the polygon terminates, and no further lines are generated. For example, as shown in FIG. 4I, the user selected first node 430A and closed the AOI around the desired shelf.

Figure 4J:
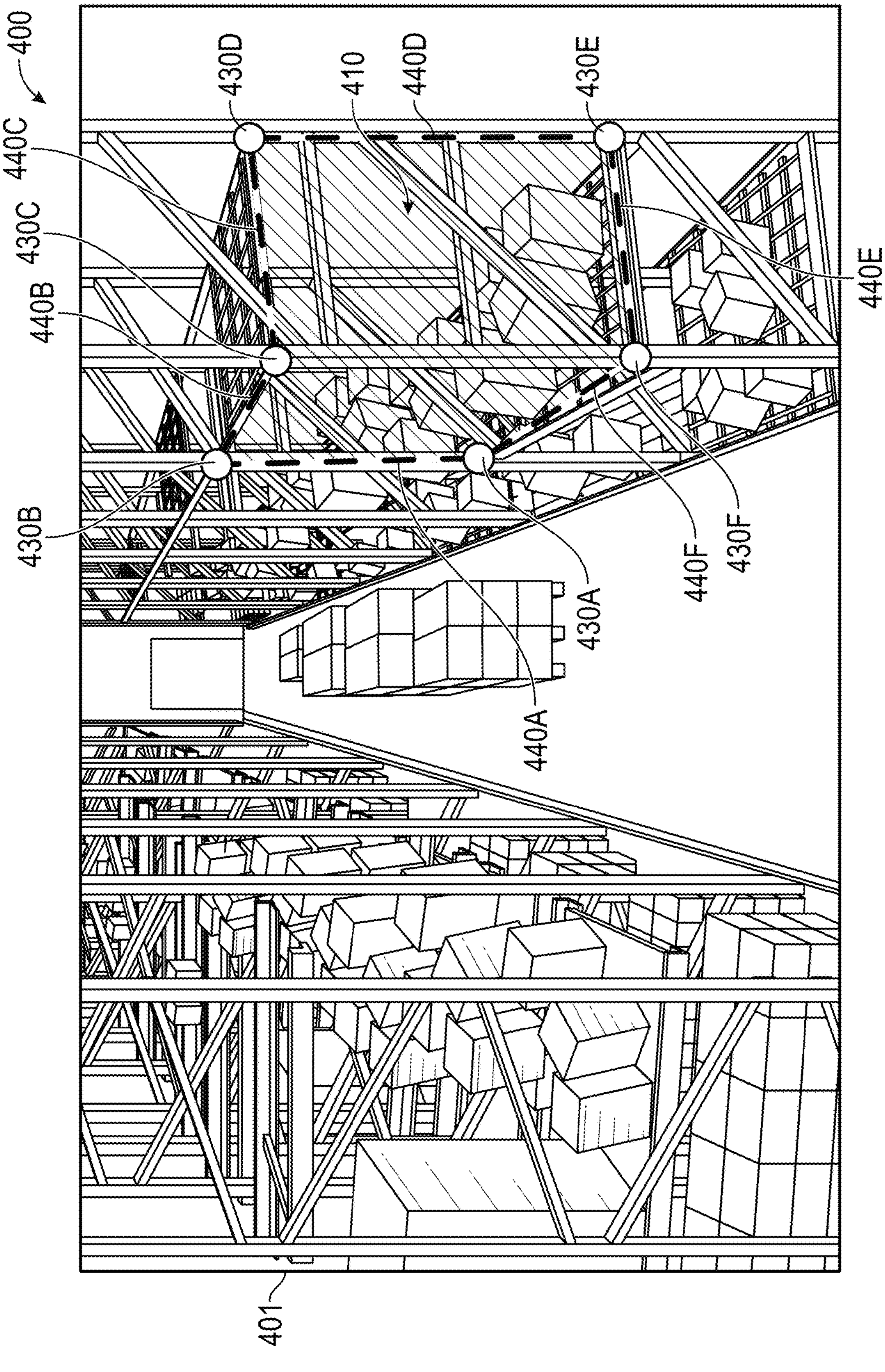

FIG. 4J illustrates the first image 401 displayed on the interactive user interface 400 once the user closed the AOI by selecting the existing first node 430A. As shown, an AOI 410 is generated in FIG. 4J. In some embodiments, a generated AOI 410 may include some graphical indication displayed on the interactive user interface 400. For example, as shown in FIG. 4J, AOI 410 is illustrated on interactive user interface 400 as a shaded area. In some embodiments, AOI may be illustrated on the interactive user interface 400 as a different color, with solid or dashed lines surrounding the area, with a different transparency, and/or the like. In some embodiments, once an AOI is generated, the normal video stream may include an indication of the existence of the AOI, while in other embodiments, there is no visual indication of the existing AOI.

In some embodiments, while generating an AOI, moving the cursor 420 over an existing node may cause the interactive user interface 400 to display a graphical indication that the node can be selected to terminate the AOL. For example, the existing node may change color, increase in size, decrease in size, pulse, change to include a line around the node, become highlighted, and/or the like. In some embodiments, existing nodes that cannot be selected to complete an AOI (e.g., the first node and the second node when a third node has not been placed or a node that would not complete the polygon) may not have a changed display or may display a different graphical indication that the node cannot be selected. For example, nodes that can be selected may change to a first color (e.g., blue) when the cursor 420 is positioned over the node and nodes that cannot be selected may change to a second color (e.g., red) when the cursor 420 is positioned over the node. In some embodiments, nodes may include a visual indication to indicate whether they can be selected regardless of the position of the cursor 420.

In some embodiments, users may be able to select a node and adjust the position of the node on the interactive user interface 400. For example, the user may click and drag the node to a new location, updating the stored coordinates corresponding to that node. In some embodiments, when a user completes an AOI by selecting an existing node, any trailing nodes and/or lines may be removed from the display. For example, if in FIG. 4J, the user selected second node 430B instead of first node 430A, lines 440A, 440B, and first node 430A would disappear and the completed AOI would have vertices at nodes 430B, 430C, 430D, 430E, and 430F.

In some embodiments, the user may be prevented from closing a polygon if an invalid polygon would be generated. In some embodiments, the user may be able to add new nodes and connect lines from an existing AOL. In some embodiments, users may be able to select and entire AOI and move the AOI to a new location. Moving the AOI updates the corresponding coordinates stored in the database.

In some embodiments, the example drawing tool method of defining an AOI, and/or any method of defining an AOI, on an interactive user interface may comprise using an html overlay and mouse event handlers to draw PAOIs as styled html elements. In some embodiments, the AOI coordinates corresponding to the nodes may be x, y decimals between 0.0 and 1.0 inclusive. For example, the bottom left of an interactive user interface may be 0.0 x, 0.0 y, and the tope right of an interactive user interface may be 1.0 x, 1.0 y.

FIGS. 5A-5D illustrate an example user interface 500 associated with an example machine learning method of defining an AOL. In the example of FIGS. 5A-5D, a user may use the user device 110 to define an AOL. For example, a machine learning model may be configured to analyze an image comprising a video still and identify areas in the video still that may have value as an AOL. Some common examples of potential areas of interest in a worksite may include floors, shelves, doors, work surfaces, hazard areas, and/or the like. It is recognized that the potential area of interest varies based on the worksite and the target features to be detected. When the machine learning model identifies an area, the area may include three or more coordinates corresponding to the vertices of the polygonal area. In some embodiments, a user may use a cursor to select one or more machine learning generated areas as a desired AOL. When a generated area is selected as an AOI, the coordinates corresponding to the vertices may be stored in a database associated with, for example, the gateway 120, the backend server 130, and/or the user device 110, as described above.

In the examples of FIGS. 5A-5D, a video still from a target environment is displayed. As described above in FIG. 3, the video still may be acquired from a camera at the corresponding target environment. For example, the gateway 120 may provide one or more video stills from a camera that is in communication with the gateway 120 (e.g., one of a plurality of cameras at a work site), so that the user device 110 may receive input from a user to define AOI within the field of view of the particular camera. For example, the user may use a mouse to define a desired AOL. While the method described with reference to FIGS. 5A-5D describes certain steps, it is recognized that in other embodiment, the method may include fewer and/or additional steps and/or the steps may be performed in order different than as illustrated. For ease of explanation, the process of FIG. 5A-5D is discussed below with reference to defining two AOI on a single video still. However, the same or similar process may be performed to create any number of AOI on the video still and to define one or more AOI on multiple video stills corresponding to multiple cameras/gateways 120, such as multiple cameras at a particular worksite.

Figure 5A:
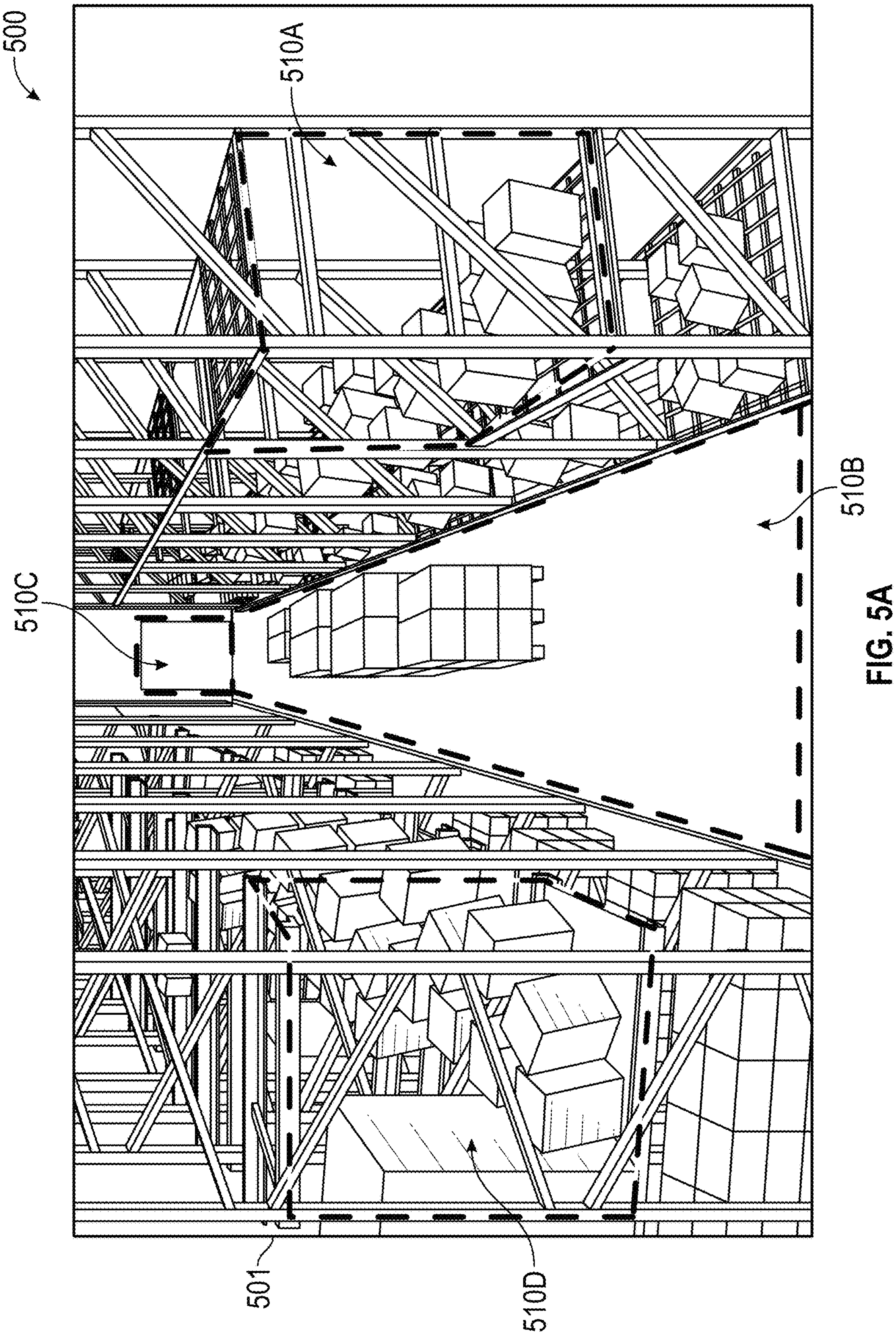
FIG. 5A-5D are example interactive user interfaces illustrating an example method of defining a polygonal area of interest.

FIG. 5A illustrates a first image 501 displayed on the interactive user interface 500. As described in blocks 320 and 330 of FIG. 3, the gateway 120 provides one or more images of a video stream of a camera to the user device 110, where a camera is positioned to obtain a video stream of the target environment. The video stream from the camera generally includes a plurality of images, each having a common coordinate space (e.g., the field of view of the camera is consistent). The first image 501 comprises a video still or at least a portion of the video still of the target environment received from the gateway 120. In the example of FIGS. 5A-5D, the target environment is a warehouse including a floor, a doorway, numerous shelves and boxes, etc.

As shown in FIG. 5A, a machine learning model has identified four unique areas that a user may wish to select as an AOL. It is recognized that the machine learning model may select more of less than four areas and the four areas identified in FIG. 5A are for illustrative purposes only. In this example, the machine learning model identified polygonal area 510A, which encompasses a first shelf in the warehouse, polygonal area 510B, which encompasses a walkway of the warehouse, polygonal area 510C, which encompasses a doorway of the warehouse, and polygonal area 510D, which encompasses a second shelf in the warehouse, as potential areas of interest. As noted, each of these polygonal areas include coordinates corresponding to the vertices of the polygons. In some embodiments, the machine learning model may be trained, for example, on previous selections of AOIs by users in other video stills, edge detection models, polygonal shape models (e.g., based on combinations of detected edges that connect to form a polygon), and/or other training or model data.

The machine learning model identified areas may be illustrated on the interactive user interface 500 as having dashed lines sounding the areas, as shown in FIG. 5A. In other embodiments, the machine learning model identified areas may be illustrated on the interactive user interface 500 as having solid lines surrounding the areas, as different colors, with a different transparency, and/or the like. In some embodiments, the location of the vertices/coordinates may be illustrated on the interactive user interface 500 such, for example, as nodes described above with reference to FIG. 4.

Figure 5B:
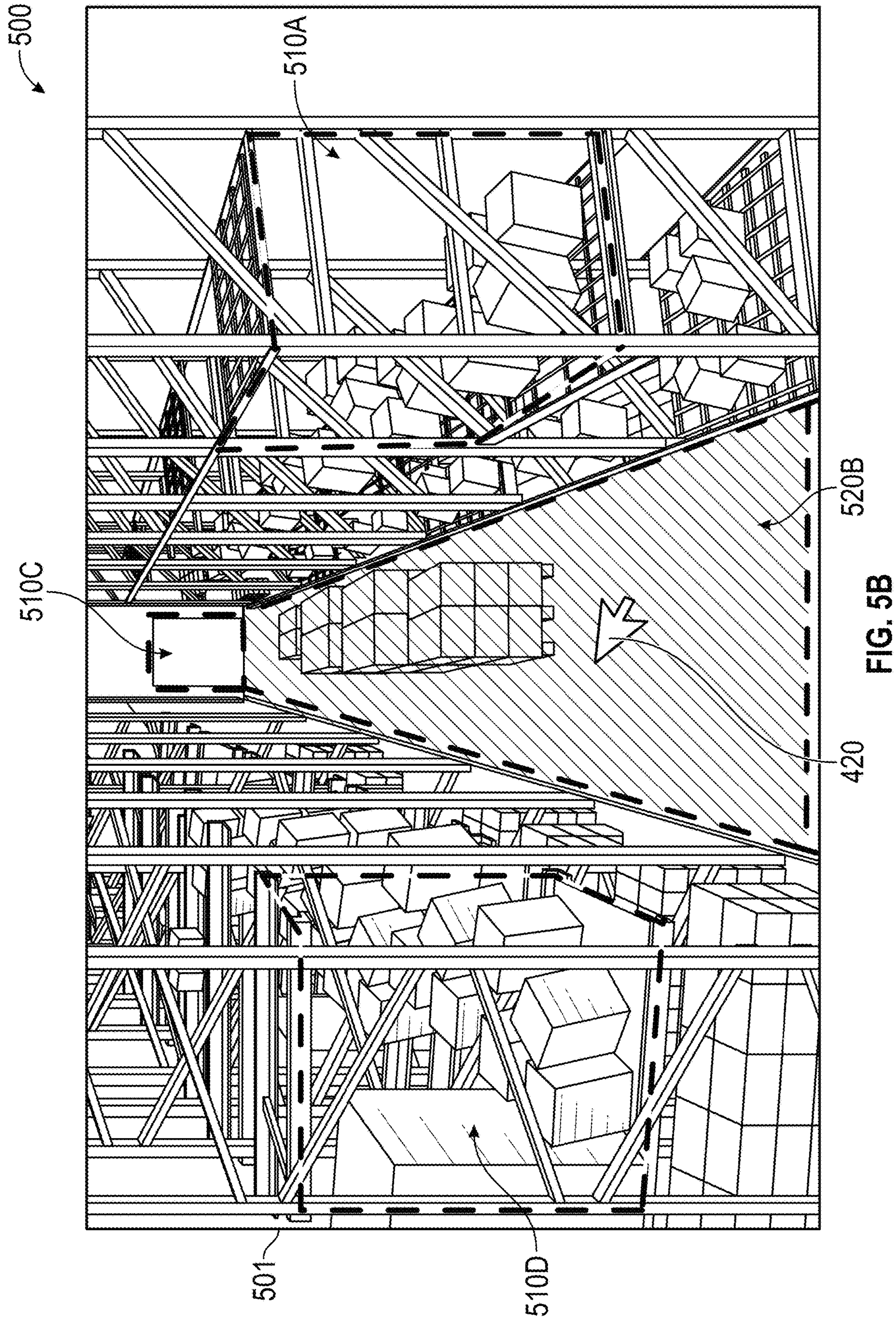

FIG. 5B illustrates the first image 501 displayed on the interactive user interface 500 following the users' activities in FIG. 5A. In FIG. 5B, the user has moved the cursor 420 and selected polygonal area 510B. By selecting polygonal area 510B, an AOI 520B has been generated and displayed in the interactive user interface 500, replacing polygonal area 510B. In some embodiments, the generated AOI 520B may include some graphical indication displayed on the interactive user interface 500. For example, as shown in FIG. 5B, AOI 520B is illustrated on interactive user interface 500 as a shaded area. In some embodiments, an AOI may be illustrated on the interactive user interface 500 as a different color, with solid or dashed lines surrounding the area, with a different transparency, and/or the like. In some embodiments, once an AOI is generated, the normal video stream may include an indication of the existence of the AOI, while in other embodiments, there is no visual indication of the existing AOL. By selecting polygonal area 510B, and generating AOI 520B, the coordinates corresponding the vertices of AOI 520B have been stored in, for example, a database associated with the gateway 120, the backend server 130, and/or the user device 110.

Figure 5C:
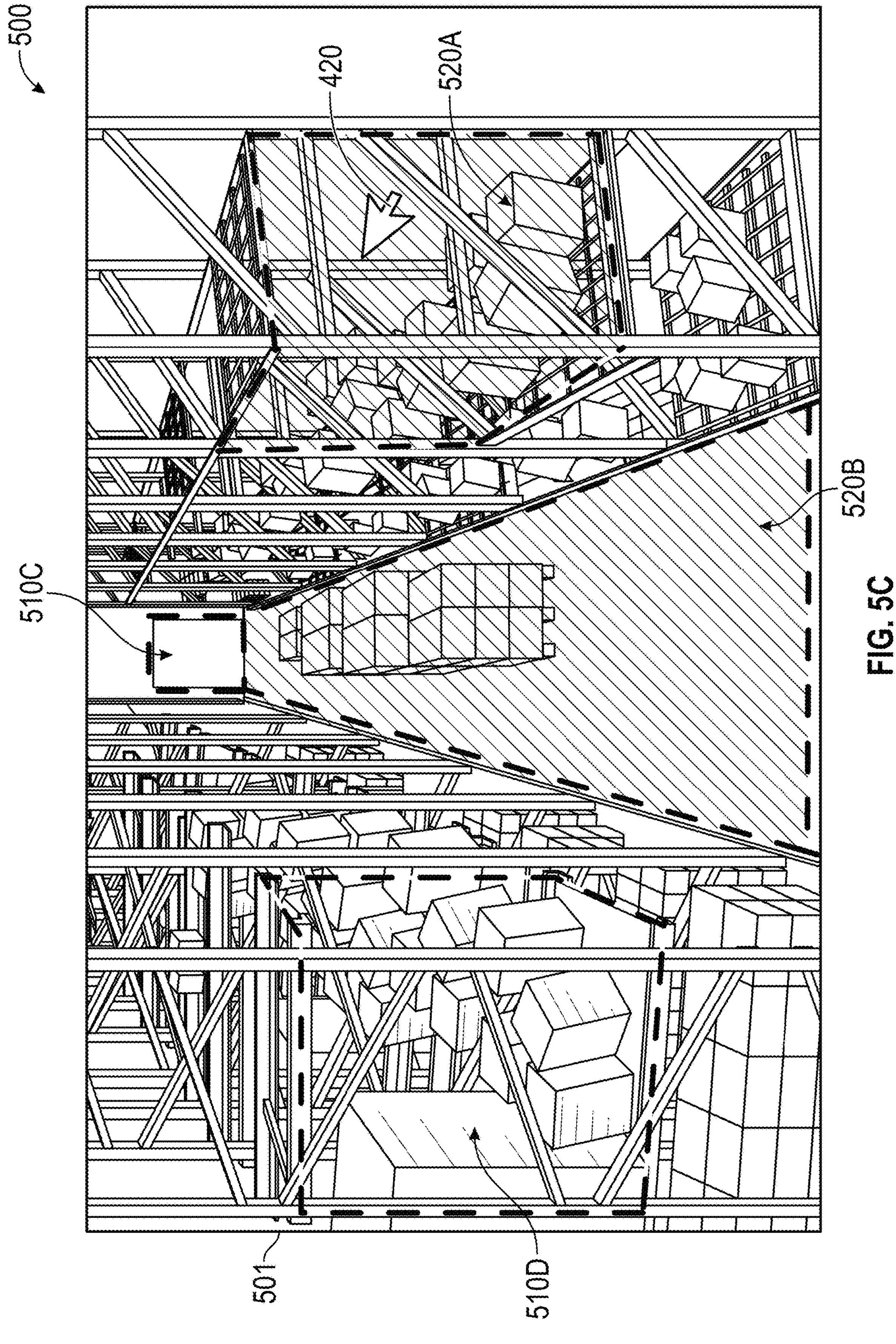

FIG. 5C illustrates the first image 501 displayed on the interactive user interface 500 following the users' activities in FIG. 5B. In FIG. 5C, the user has moved the cursor 420 and selected polygonal area 510A. By selecting polygonal area 510A, an AOI 520A has been generated and displayed in the interactive user interface 500, replacing polygonal area 510B. The coordinates corresponding the vertices of AOI 520B have been stored in, for example, a database associated with the backend server 130.

Figure 5D:
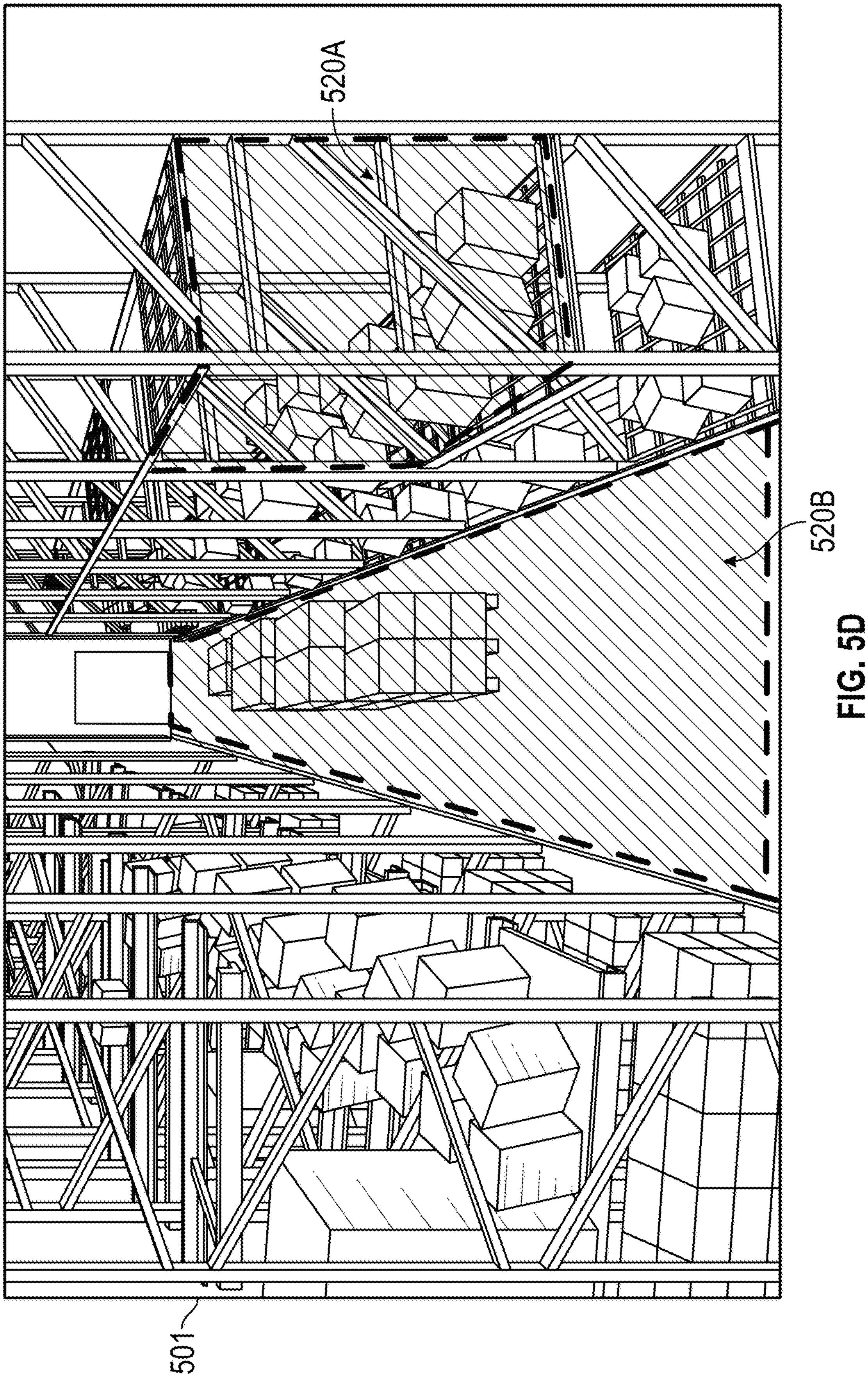

FIG. 5D illustrates the first image 501 displayed on the interactive user interface 500 following the users' activities in FIG. 5C. In FIG. 5D, the user may indicate that all the desired AOI have been selected. In response, the interactive user interface 500 may be updated to remove the visual indication of the unselected machine learning model generated areas. For example, as shown in FIG. 5D, polygonal areas 510C and 510D are no longer displayed in the interactive user interface 500.

In some embodiments, a user may be able to modify the position of the machine learning model generated coordinates. For example, the interactive user interface 500 may be configured to display the coordinates of the vertices of the generated areas such as, for example, as nodes described above with reference to FIG. 4. In some embodiments, a user can select a node (e.g., using cursor 420) and drag the node to a new location on the interactive user interface 500. When the node is selected and positioned in a new location, the corresponding coordinates for the node are updated in the database.

In some embodiments, moving the cursor 420 over a generated polygonal area may cause the interactive user interface 500 to display a graphical indication that the polygonal area can be clicked to generate the AOL. For example, the polygonal area may change color, increase in size, decrease in size, pulse, change to include a line around the polygonal area, become highlighted, and/or the like.

FIGS. 6A-6D illustrate another example drawing tool method of defining an AOI on an interactive user interface 600. In the example of FIGS. 6A-6D, a user may use the user device 110 to define an AOL. For example, the user may use a mouse to create an initial rectangular area and further adjust/add new vertices to the rectangular area to define the coordinates of a desired AOL. When the user creates the initial rectangular area, the area may include four coordinates corresponding to the vertices of the rectangular area. In some embodiments, a user may use a cursor to select one or more of the initial coordinates, shown as nodes, to drag and drop the nodes to a new position on the interactive user interface 600. In some embodiments, a user may add new nodes on the initial rectangular area, creating a new polygon, where the new nodes can be dragged and dropped to a new location. When the user finalizes the positions of the nodes, the user can define the area as an AOL. The coordinates corresponding to the vertices (e.g., shown as nodes) of the AOI may be stored in a database associated with, for example, the gateway 120, the backend server 130, and/or the user device 110 as described above.

In the examples of FIGS. 6A-6D, a video still from a target environment is displayed. As described above in FIG. 3, the video still may be acquired from a camera at the corresponding target environment. For example, the gateway 120 may provide one or more video stills from a camera that is in communication with the gateway 120 (e.g., one of a plurality of cameras at a work site), so that the user device 110 may receive input from a user to define AOI within the field of view of the particular camera. For example, the user may use a mouse to define a desired AOL. While the method described with reference to FIGS. 6A-6D describes certain steps, it is recognized that in other embodiment, the method may include fewer and/or additional steps and/or the steps may be performed in order different than as illustrated. For ease of explanation, the process of FIG. 6A-6D is discussed below with reference to defining a single AOI on a single video still. However, the same or similar process may be performed to create any number of AOI on the video still and to define one or more AOI on multiple video stills corresponding to multiple cameras/gateways 120, such as multiple cameras at a particular worksite.

Figure 6A:
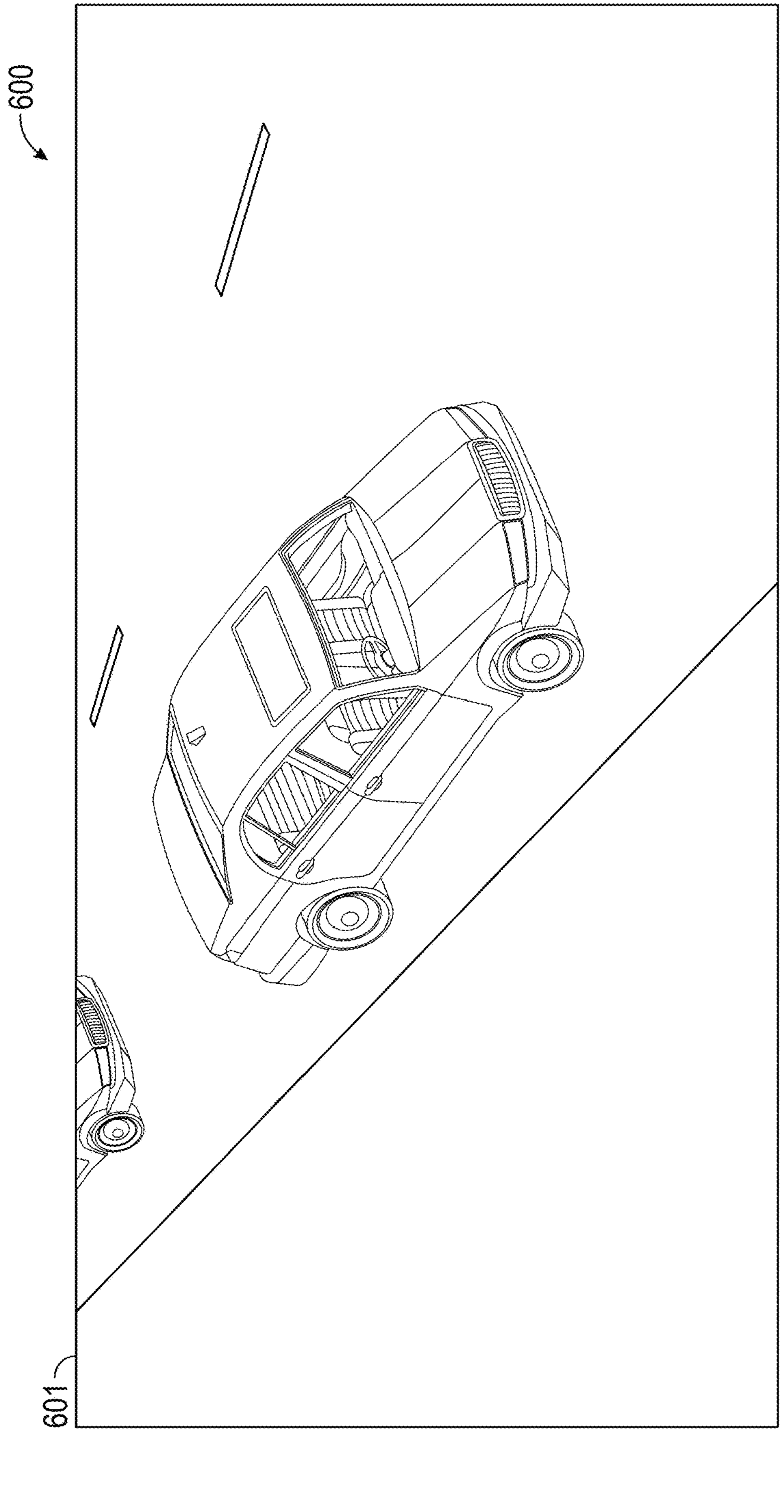
FIG. 6A-6D are example interactive user interfaces illustrating an example method of defining a polygonal area of interest.

FIG. 6A illustrates a first image 601 displayed on the interactive user interface 600. As described in blocks 320 and 330 of FIG. 3, the gateway 120 provides one or more images of a video stream of a camera to the user device 110, where a camera is positioned to obtain a video stream of the target environment. The video stream from the camera generally includes a plurality of images, each having a common coordinate space (e.g., the field of view of the camera is consistent. The first image 601 comprises a video still or at least a portion of the video still of the target environment received from the gateway 120. In the example of FIGS. 6A-6D, the target environment is a street, including a road and a sidewalk.

Figure 6B:
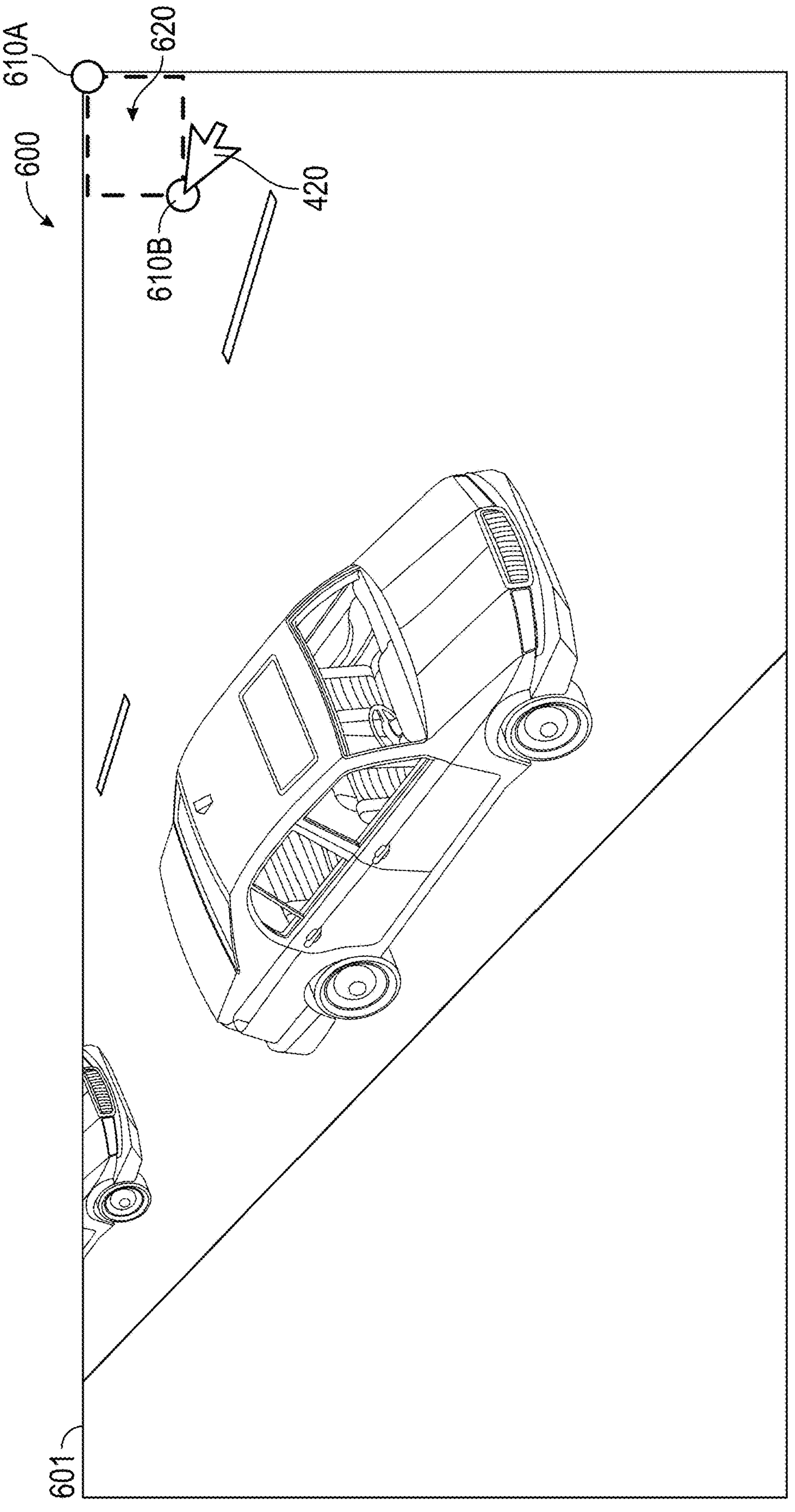
Figure 6C:
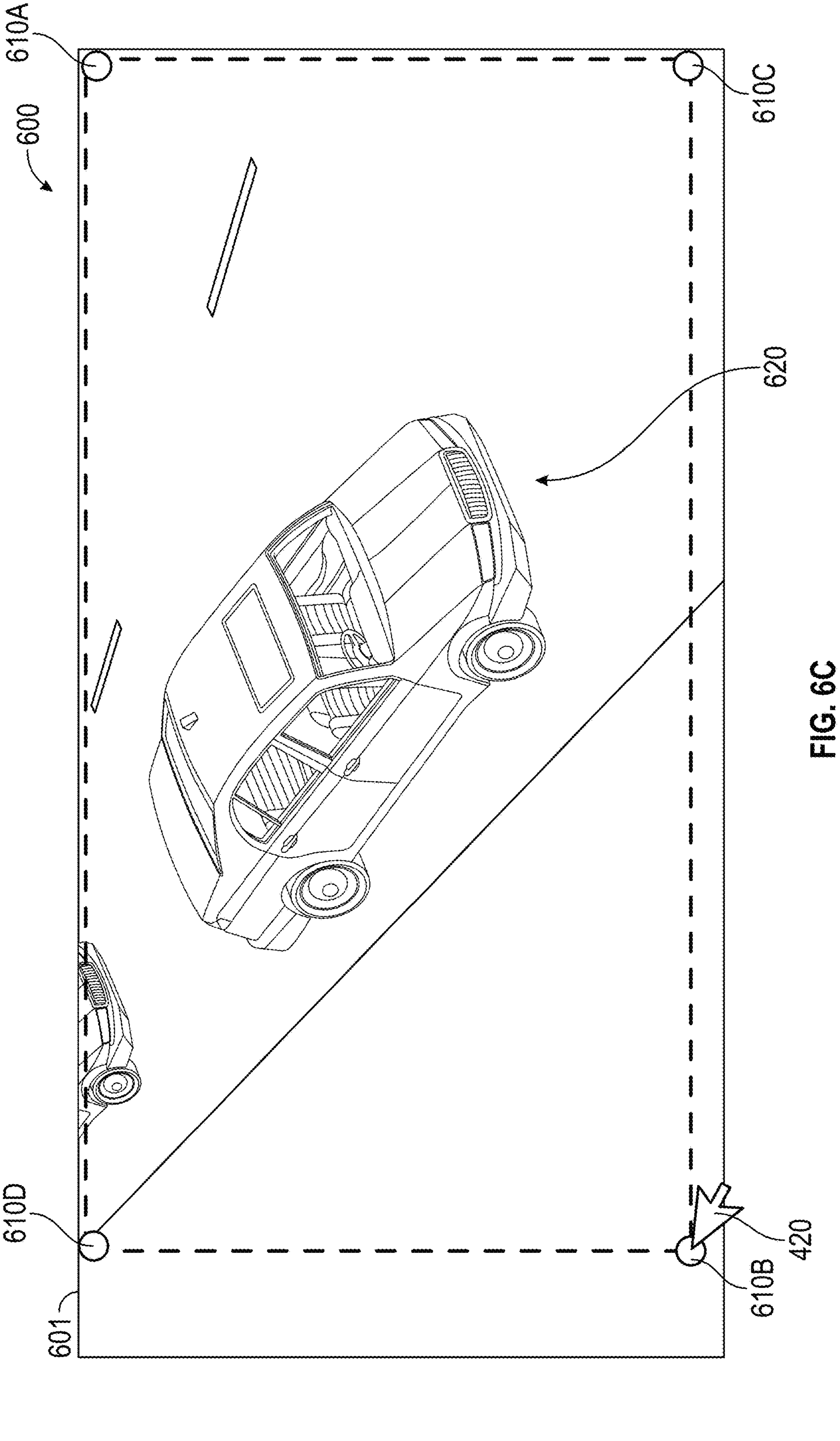

FIG. 6B illustrates the first image 601 displayed on the interactive user interface 600. In FIG. 6B, the user has begun to define the initial coordinates of an AOI 620 by choosing a position for the first node 610A. In some embodiments, the position of a first node (e.g., first node 610A) may be chosen by selecting a location on the interactive user interface 600 using, for example, cursor 420. By selecting a location for the first node 610A, the first node 610 becomes anchored to the selected location and a second node 610B is generated, where the second node 610 is anchored to the cursor 420. As shown in FIGS. 6B and 6C, as the user moves the cursor 420, the second node 610B moves with the cursor 420, creating a rectangular AOI 620. In some embodiments, the rectangular area may be illustrated as having dashed lines, as shown in FIGS. 6B and 6C. In other embodiments, the rectangular area may be illustrated on the interactive user interface 600 as having solid lines surrounding the area, as a different color, with a different transparency, and/or the like.

FIG. 6C illustrates the first image 601 displayed on the interactive user interface 600 following the users' activities in FIG. 6B. In FIG. 6C, the user has moved the cursor 420 to a position in the bottom left side of the interactive user interface 600 and placed the second node 610B in that position. In some embodiments, the second node 610B may be placed in a position on the interactive user interface 600 by, for example, left clicking with a mouse or providing some other instruction to the user device 110. By selecting the position of the second node 610B, nodes 610C and 610D are generated and the AOI 620 is defined by vertices 610A-610D. In some embodiments, nodes 610C and 610D may be generated and displayed prior to the user selecting the position of the second node 610B. The user can use the rectangular shape as the AOI 620 or add further vertices to further refine the AOI 620 and/or reshape the AOI 620 by moving existing nodes. Coordinates corresponding to the position of the nodes (e.g., 610A-610D) may be stored in a database associated with the gateway 120, the backend server 130, and/or the user device 110.

Figure 6D:
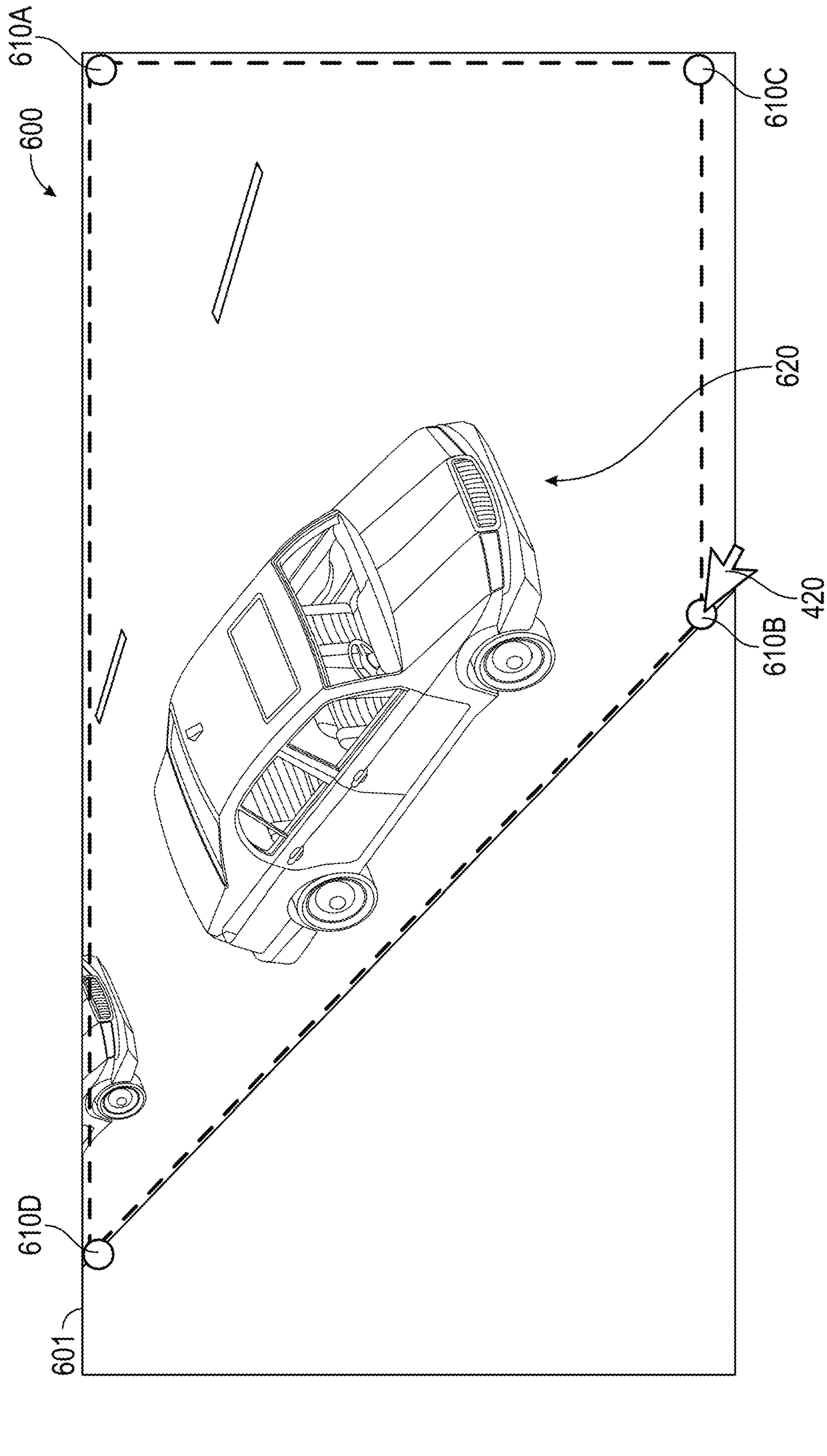

FIG. 6D illustrates the first image 601 displayed on the interactive user interface 600 following the users' activities in FIG. 6C. In FIG. 6D, the user has selected second node 610B (e.g., using cursor 420) and dragged the second node 610B to a new position on the interactive user interface 600. In some embodiments, by selecting the second node 610B, the second node 610B becomes anchored to the cursor 420. For example, as the user moves the cursor 420, the second node 610B moves with the cursor 420 and nodes that are already positioned (e.g., nodes 610A, 610C, and 610D) remain at their current position. In some embodiments, the second node 610B may be placed in a new position on the interactive user interface 600 by, for example, left clicking with a mouse or providing some other instruction to the user device 110. By moving the position of the second node 610B, the shape of AOI 620 has been changed. When a node is selected and positioned in a new location, the corresponding coordinates for the node are updated in the database.

In some embodiments, a user may be able to add new vertices to an AOI (e.g., AOI 620) by, for example, clicking on an existing line of the AOI 620 using the cursor 420. Clicking on the line of an existing AOI may generate a new node corresponding to a new vertices of the AOL. In some embodiments, by generating a new node, the new node becomes anchored to the cursor 420. For example, as the user moves the cursor 420, the new node moves with the cursor 420 and nodes that are already positioned (e.g., nodes 610A-610D) remain at their current position. The new node may be positioned by, for example, clicking on a new position in the interactive user interface 600. When the node is selected and positioned in a new location, the corresponding coordinates for the node and the PAOI are updated in the database.

In some embodiments, a user may be able to cancel nodes by providing an instruction (e.g., input) to the user device 110. In some embodiments, a user may be able to combine existing nodes to create a new AOL. By combining existing nodes, an AOI with less than four vertices can be created. For example, when a user uses the example drawing tool method of FIG. 6A-6D but desires an AOI with three vertices, the user may be able to drag one existing vertex (e.g., 610B) onto another existing vertex (e.g., 610C) and combine the vertices. By combing the vertices, the AOI (e.g., AOI 620) is updated in the interactive user interface 600 and the corresponding coordinates are updated in the database.

While FIGS. 4A-4J, 5A-5D, and 6A-6D illustrate example methods of defining AOIs in an interactive user interface, it is recognized that additional methods may be used. It is also recognized that the methods may be combined and features from one method may be used in another method. References to a cursor and/or mouse system may be used interchangeably with a stylus or finger for use on a user device 110 including a touch screen display.

Additionally, while FIGS. 4A-6D illustrate a user defining AOIs in a 2D plane, in some embodiments, a user may have able to define an AOI as a plane in the 3D space captured in the image. For example, rather than defining the entire shelf as the AOI in FIGS. 4A-4J, the user may be able to define only the base plane of the shelf as the AOL. By defining individual planes in a 3D space, the accuracy of the feature detection and event determination can be improved.

VI. Example Bounding Areas of Detected Features

FIG. 7 illustrates an image 701 displayed on the interactive user interface 700 and bounding areas of detected features. As described in blocks 320 and 330 of FIG. 3, the gateway 120 provides one or more images of a video stream of a camera to the user device 110, where a camera is positioned to obtain a video stream of the target environment. The video stream from the camera generally includes a plurality of images, each having a common coordinate space common coordinate space (e.g., the field of view of the camera is consistent). The image 701 shown in FIG. 7 comprises a video still or at least a portion of the video still of the target environment received from the gateway 120. In the example of FIGS. 7, the target environment is a street, including a road and a sidewalk.

In the example of FIG. 7, the feature of interest associated with the feature detection algorithm may be humans (e.g., as discussed in block 350 of FIG. 3). For example, the feature detection component of the gateway 120 and/or the backend server 130 may be configured to determine whether humans are present in the video still shown in interactive user interface 700. Because two humans, person 710A and person 710B, are present in the image 701, the feature detection component outputs feature coordinates that define the bounding area of the features of interest (e.g., person 710A and person 710B) within the field of view of the particular camera. In this example, two bounding areas are generated, bounding area 730A and bounding area 730B, with the corresponding feature coordinates being the vertices of the bounding areas. While bounding areas 730A and 730B are illustrated as dotted lines, any other visual indication may be used, and in some embodiments, no indication of the bounding areas 730A and 730B may be displayed on the interactive user interface 700.

With reference to block 370 of FIG. 3, in response to detection of the particular feature of interest, persons 710A and 710B, the feature detection component determines the feature coordinates that may define a bounding area of the detected features and determines whether the bounding areas of any detected features overlap with one or more of the AOI defined by the user. The feature coordinates may be stored in a database associate with the gateway 120, backend server 130, and/or user device 110. In the example of FIG. 7, two AOI are illustrated, AOI 720A, corresponding to the street in the image 701, and AOI 720B, corresponding to the sidewalk in the image 701. Based on the coordinates of bounding areas 730A, the feature detection algorithm would determine that person 710A in bounding area 730A is within AOI 720A because the bounding area 730A overlaps with AOI 720A. Based on the coordinates of bounding area 730B, the feature detection algorithm would determine that person 710B in bounding area 730B is within AOI 720A and AOI 720B because bounding area 730B overlaps with both AOI 720A and AOI 720B.

Because the feature detection component can determine that a bounding area of a detected feature overlaps with two or more AOI, in some embodiments, the feature detection component (and associated feature detection algorithm) may be further configured to select the most appropriate AOI that the detected feature is located in prior to determining that an event has occurred or issuing a notification (e.g., as discussed in block 380 of FIG. 3). For example, one method of isolating the most appropriate AOI includes determining one or more grounding coordinate(s) of a detected feature and determining which AOI the grounding coordinate(s) is located in. For example, bounding areas 730A includes grounding coordinate 740A and bounding areas 730B includes grounding coordinate 740B. In some embodiments, the feature detection component may determine the position of the grounding coordinate by calculating the location between the bottom two feature coordinates of a bounding area. For example, if a bounding area (e.g., bounding area 730B) had (x, y) feature coordinates (0.2, 0.2), (0.4, 0.2), (0.2, 0.6), and (0.4, 0.6), the feature detection algorithm would determine that the grounding coordinate's (e.g., grounding coordinate 740B) location is (0.3, 0.2). The grounding coordinate may be stored in a database associated with the gateway 120, the backend server 130, and/or the user device 110. Once the location of the grounding coordinate is determined, the feature detection algorithm may determine which AOI the grounding coordinate is located in. For example, based on the location of grounding coordinate 740B, the feature detection component would determine that the grounding coordinate 740B is located within AOI 720B and therefore that person 710B is located in AOI 720B and not AOI 720A. Based on this determination, the feature detection component determines an event has occurred and issues a notification if AOI 720B is the AOI for that particular workflow. In the example shown in FIG. 7, the feature detection component may be configured to determine whether features of interest (e.g., persons 710A and 710B) are located in the street. Based on the above process, the feature detection component would determine that person 710B is not in the street and that no event corresponding to person 710B occurred. Similarly, the feature detection component would determine that person 710A is in the street and an event corresponding to person 710B has occurred. Based on this determination, the feature detection component would initiate a notification and a workflow would proceed.

Grounding coordinates located at the base of a bounding area may be relevant for some features of interest, such as, for example, when the location of the base of a feature of interest is the most important location for event detection. However, in some embodiments, the grounding coordinate may be located anywhere on the bounding area, such as, for example, at the bottom, the top, the center, the sides, and/or the like of the bounding area. In some embodiments, a user may be able to customize the location of the grounding coordinates in the feature detection algorithm. In some embodiments, the grounding coordinate may be located at a low center point of the bounding area but not on the base of the bounding area.

In some embodiments, the feature detection component may determine which AOI the detected feature is in by performing an intersection over area calculation. For example, the feature detection component may determine a percentage of the bounding area that is within an AOL. For example, the bounding area 730B may be 30% within the AOI 720A and 70% within the AOI 720B. Based on this determination, the percentage may be compared to a threshold to determine which AOI the feature of interest is in. For example, the threshold may be 10, 20, 30, 40, 50, 60, 70, 80, 90, and/or the like percentage. Based on the threshold value, a bounding area may be determined to be in one or more AOI.

In some embodiments, users may be able to define the method of determining whether the bounding area of a feature of interest overlaps a specific AOI and may be able to define multiple methods for multiple AOI within a video stream. For example, when a user defines an AOI to encompass a floor, the feature detection component may be configured to apply a grounding coordinate approach to determining if there is an event. In another example, when the AOI encompasses a portion of the sky, the grounding coordinate approach may not be beneficial, and the feature detection component may perform a different method of whether an event has occurred.

In some embodiments, an interactive user interface displayed on a user device may include a video bar that displays information about detected features and events. For example, interactive user interface 700 displayed on user device 110 includes video bar 750. The video bar 750 may be used to visually indicate when features are detected within the video steam and when the detected features overlap with an AOL. For example, in video bar 750, features of interest were detected in the video stream twice as shown by feature bars 752A and 752B. In some embodiments, within each feature bar, there may be a separate indication of when a feature of interest overlapped with an AOL. For example, in the first feature bar 752A, a feature of interest overlapped with the AOI three times, shown as event 754A, event 754B, and event 754C. Similarly, in the second feature bar 752B, a feature of interest overlapped with the AOI twice, shown as event 754D and 754E. In some embodiments, the video bar 750 may be displayed in a video still displayed on an interactive user interface displayed on a user device. In some embodiments, the video bar 750 may be displayed in the live video stream displayed in a video still displayed on an interactive user interface displayed on a user device.

VII. Example Computing System

Figure 8:
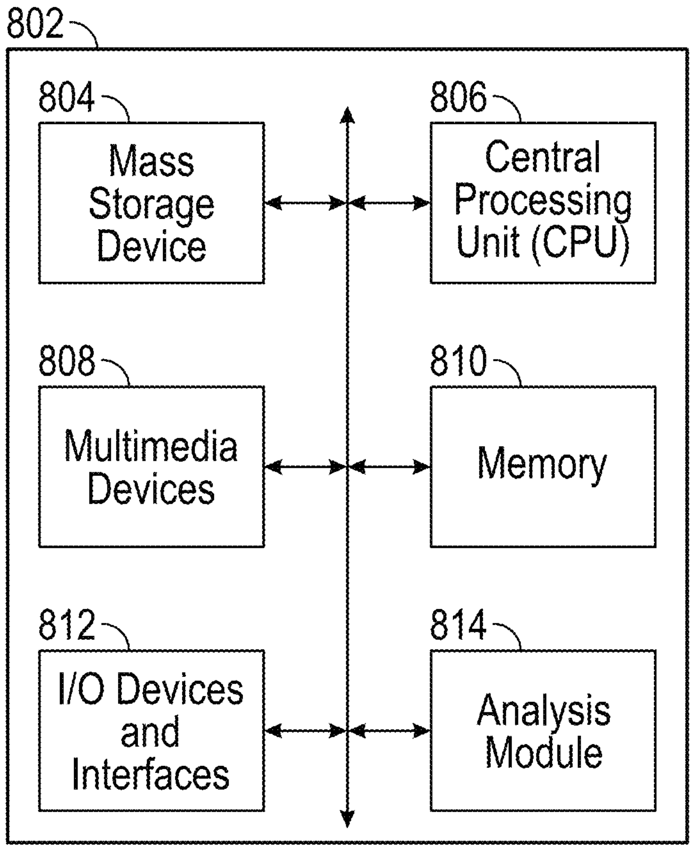
FIG. 8 is an example computing system which may implement example embodiments of one or more components of the gateway system and backend server.

FIG. 8 is a block diagram depicting an embodiment of a computer hardware system configured to run software for implementing one or more embodiments disclosed herein.

In some embodiments, the systems, processes, and methods described herein are implemented using a computing system, such as the one illustrated in FIG. 8. The example computer system 802 is in communication with one or more computing systems and/or one or more data sources via one or more networks. While FIG. 8 illustrates an embodiment of a computing system 802, it is recognized that the functionality provided for in the components and modules of computer system 802 may be combined into fewer components and modules, or further separated into additional components and modules.

The computer system 802 can comprise an analysis module 814 that carries out the functions, methods, acts, and/or processes described herein. The analysis module 814 is executed on the computer system 802 by a central processing unit 806 discussed further below.

In general, the word "module," as used herein, refers to logic embodied in hardware or firmware or to a collection of software instructions, having entry and exit points. Modules are written in a program language, such as JAVA, C or C++, Python, or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 802 includes one or more processing units (CPU) 806, which may comprise a microprocessor. The computer system 802 further includes a physical memory 810, such as random-access memory (RAM) for temporary storage of information, a read only memory (ROM) for permanent storage of information, and a mass storage device 804, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 802 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 802 includes one or more input/output (I/O) devices and interfaces 812, such as a keyboard, mouse, touch pad, and printer. The I/O devices and interfaces 812 can include one or more display devices, such as a monitor, which allows the visual presentation of data to a user. More particularly, a display device provides for the presentation of GUIs as application software data, and multi-media presentations, for example. The I/O devices and interfaces 812 can also provide a communications interface to various external devices. The computer system 802 may comprise one or more multi-media devices 808, such as speakers, video cards, graphics accelerators, and microphones, for example.

The computer system 802 may run on a variety of computing devices, such as a server, a Windows server, a Structure Query Language server, a Unix Server, a personal computer, a laptop computer, a smart phone, a personal digital assistant, a tablet, and so forth. Servers may include a variety of servers such as database servers (for example, Oracle, DB2, Informix, Microsoft SQL Server, MySQL, or Ingres), application servers, data loader servers, or web servers. In addition, the servers may run a variety of software for data visualization, distributed file systems, distributed processing, web portals, enterprise workflow, form management, and so forth. In other embodiments, the computer system 802 may run on a cluster computer system, a mainframe computer system and/or other computing system suitable for controlling and/or communicating with large databases, performing high volume transaction processing, and generating reports from large databases. The computing system 802 is generally controlled and coordinated by an operating system software, such as Windows XP, Windows Vista, Windows 7, Windows 8, Windows 10, Windows 11, Windows Server, Unix, Linux (and its variants such as Debian, Linux Mint, Fedora, and Red Hat), SunOS, Solaris, Blackberry OS, z/OS, iOS, macOS, or other operating systems, including proprietary operating systems. Operating systems control and schedule computer processes for execution, perform memory management, provide file system, networking, and I/O services, and provide a user interface, such as a graphical user interface (GUI), among other things.

The computer system 802 illustrated in FIG. 8 is coupled to a network, such as a LAN, WAN, or the Internet via a communication link 816 (wired, wireless, or a combination thereof). The Network communicates with various computing devices and/or other electronic devices. The Network is communicating with one or more computing systems and one or more data sources. The analysis module 814 may access or may be accessed by computing systems and/or data sources through a web-enabled user access point. Connections may be a direct physical connection, a virtual connection, and other connection type. The web-enabled user access point may comprise a browser module that uses text, graphics, audio, video, and other media to present data and to allow interaction with data via the network.

Access to the analysis module 814 of the computer system 802 by computing systems and/or by data sources may be through a web-enabled user access point such as the computing systems' or data source's personal computer, cellular phone, smartphone, laptop, tablet computer, e-reader device, audio player, or another device capable of connecting to the network. Such a device may have a browser module that is implemented as a module that uses text, graphics, audio, video, and other media to present data and to allow interaction with data via the network.

The output module may be implemented as a combination of an all-points addressable display such as a cathode ray tube (CRT), a liquid crystal display (LCD), a plasma display, or other types and/or combinations of displays. The output module may be implemented to communicate with input devices 812 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 802 may comprise a physical or logical connection established between a remote microprocessor and a mainframe host computer for the express purpose of uploading, downloading, or viewing interactive data and databases online in real time. The remote microprocessor may be operated by an entity operating the computer system 802, including the client server systems or the main server system, an/or may be operated by one or more of the data sources and/or one or more of the computing systems. In some embodiments, terminal emulation software may be used on the microprocessor for participating in the micro-mainframe link.

In some embodiments, computing systems who are internal to an entity operating the computer system 802 may access the analysis module 814 internally as an application or process run by the CPU 806.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL ca specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, or the like. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 802 may include one or more internal and/or external data sources. In some embodiments, one or more of the data repositories and the data sources described above may be implemented using a relational database, such as Sybase, Oracle, CodeBase, DB2, PostgreSQL, and Microsoft® SQL Server as well as other types of databases such as, for example, a NoSQL database (for example, Couchbase, Cassandra, or MongoDB), a flat file database, an entity-relationship database, an object-oriented database (for example, InterSystems Cachd), a cloud-based database (for example, Amazon RDS, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Realtime Database, Google Memorystore, Google MogoDB Atlas, Amazon Aurora, Amazon DynamoDB, Amazon Redshift, Amazon ElastiCache, Amazon MemoryDB for Redis, Amazon DocumentDB, Amazon Keyspaces, Amazon EKS, Amazon Neptune, Amazon Timestream, or Amazon QLDB), a non-relational database, or a record-based database.

The computer system 802 may also access one or more databases. The databases may be stored in a database or data repository. The computer system 802 may access the one or more databases through a network or may directly access the database or data repository through I/O devices and interfaces 812. The data repository storing the one or more databases may reside within the computer system 802.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression, or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computerized method, performed by a computing system having one or more hardware computer processors and one or more non-transitory computer readable storage device storing software instructions executable by the computing system to perform the computerized method comprising:

accessing video data from a video device positioned to obtain a video stream of an environment, wherein the video stream includes a plurality of images each having a common coordinate space;

displaying, on a display of the computing system, an interactive user interface including at least a portion of a first image of the plurality of images of the environment;

receiving, via the interactive user interface, user input defining a polygonal area of interest overlapping at least a portion of the first image, wherein the polygonal area of interest is defined by at least three coordinates within the common coordinate space;

receiving, via the interactive user interface, user input selecting a feature detection algorithm associated with a particular feature of interest;

periodically executing the selected feature detection algorithm on one or more most recent images of the video stream, wherein the feature detection algorithm is configured to output feature coordinates within the common coordinate space in response to detection of the particular feature of interest;

in response to detection of the particular feature of interest, determining whether the detected particular feature of interest at least partially overlaps with the polygonal area of interest;

in response to determining that the detected particular feature of interest at least partially overlaps with the polygonal area of interest, initiating a first notification;

further in response to detection of the particular feature of interest, determining whether the feature coordinates are no longer at least partially within the polygonal area of interest; and in response to determining that the feature coordinates are no longer within the polygonal area of interest, initiating a second notification and storing event video data comprising a portion of the video stream including video data between the first notification and the second notification.

2. The computerized method of claim 1, wherein the common coordinate space is defined by x horizontal units and y vertical units.

3. The computerized method of claim 1, wherein the feature coordinates define four vertices of a rectangle.

4. The computerized method of claim 1 further comprising:

in response to determining the feature coordinates are within the polygonal area of interest, initiating a customized workflow.

5. The computerized method of claim 1, wherein user input defining a polygonal area of interest comprises a user positioning three or more coordinates within the common coordinate space via the interactive user interface.

6. The computerized method of claim 1, wherein user input defining a polygonal area of interest comprises a user selecting one or more generated polygonal areas of interest.

7. The computerized method of claim 1, further comprising:

in response to determining the feature coordinates are at least partially within the polygonal area of interest, determining whether a grounding coordinate of the particular feature of interest is within the polygonal area of interest.

8. A computerized method, performed by a computing system having one or more hardware computer processors and one or more non-transitory computer readable storage device storing software instructions executable by the computing system to perform the computerized method comprising:

accessing video data from a video device positioned to obtain a video stream of an environment, wherein the video stream includes a plurality of images each having a common coordinate space;

transmitting to a user device at least a portion of a first image of the plurality of images of the environment;

receiving, from the user device, information identifying a polygonal area of interest associated with first image;

periodically executing a feature detection algorithm on the video stream, wherein the feature detection algorithm is configured to output feature coordinates within the common coordinate space in response to detection of a feature of interest;

in response to detection of the feature of interest, determining whether the detected feature of interest at least partially overlaps with the polygonal area of interest;

in response to determining that the detected feature of interest at least partially overlaps with the polygonal area of interest, initiating a first notification;

further in response to detection of the feature of interest, determining whether the feature coordinates are no longer at least partially within the polygonal area of interest; and in response to determining that the feature coordinates are no longer within the polygonal area of interest, initiating a second notification and storing event video data comprising a portion of the video stream including video data between the first notification and the second notification.

9. The computerized method of claim 8, wherein the common coordinate space is defined by x horizontal units and y vertical units.

10. The computerized method of claim 8, wherein the feature coordinates define four vertices of a rectangle.

11. The computerized method of claim 8 further comprising:

in response to determining the feature coordinates are within the polygonal area of interest, initiating a customized workflow.

12. The computerized method of claim 8, wherein the information identifying the polygonal area of interest comprises coordinates defining vertices of the polygonal area of interest.

13. The computerized method of claim 8, further comprising:

in response to determining the feature coordinates are at least partially within the polygonal area of interest, determining whether a grounding coordinate of the particular feature of interest is within the polygonal area of interest.

14. A computerized method, performed by a computing system having one or more hardware computer processors and one or more non-transitory computer readable storage device storing software instructions executable by the computing system to perform the computerized method comprising:

receiving, from a gateway device in communication with one or more cameras, a first image of a video stream of a first camera;

displaying, on a display of a user device, an interactive user interface depicting at least a portion of the first image;

receiving, via the interactive user interface, user input defining a polygonal area of interest overlapping at least a portion of the first image;

transmitting information identifying the polygonal area of interest to a feature detection component, wherein the feature detection component is configured to:

detect a feature of interest in the video stream in response to periodically executing a feature detection algorithm on the video stream of the first camera;

generate a first notification in response to determining that the detected feature of interest at least partially overlaps with the polygonal area of interest; and generate a second notification in response to determining that the detected feature of interest is no longer at least partially within the polygonal area of interest; and store event video data comprising a portion of the video stream including video data between the first notification and the second notification;

receiving, from the feature detection component, the first notification of the detected feature of interest; and receiving, from the feature detection component, the second notification.

15. The computerized method of claim 14, wherein the feature detection component comprises one or more of a gateway or a backend computing system.

16. The computerized method of claim 14, wherein the information identifying the polygonal area of interest comprises coordinates defining vertices of the polygonal area of interest.

17. The computerized method of claim 14, wherein the first notification comprises one or more of: an electronic message, a text message, an email, and a phone call.

18. The computerized method of claim 14, wherein user input defining the polygonal area of interest comprises a user positioning three or more coordinates within a common coordinate space via the interactive user interface.

* * * * *